US009571539B2

(12) United States Patent
Sawato

(10) Patent No.: US 9,571,539 B2
(45) Date of Patent: Feb. 14, 2017

(54) METHOD AND ELECTRONIC DEVICE FOR PERFORMING EXCHANGE OF MESSAGES

(71) Applicant: HONDA MOTOR CO., LTD., Tokyo (JP)

(72) Inventor: Hiroaki Sawato, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/797,297

(22) Filed: Jul. 13, 2015

(65) Prior Publication Data

US 2016/0021155 A1 Jan. 21, 2016

(30) Foreign Application Priority Data

Jul. 17, 2014 (JP) ................. 2014-147141

(51) Int. Cl.
| | |
|---|---|
| H04L 29/06 | (2006.01) |
| H04W 4/12 | (2009.01) |
| H04W 4/04 | (2009.01) |
| H04L 12/58 | (2006.01) |
| G06F 3/0481 | (2013.01) |
| G06F 3/0484 | (2013.01) |

(52) U.S. Cl.
CPC ......... *H04L 65/403* (2013.01); *G06F 3/04817* (2013.01); *G06F 3/04845* (2013.01); *H04L 51/20* (2013.01); *H04W 4/046* (2013.01); *H04W 4/12* (2013.01); *H04L 51/32* (2013.01)

(58) Field of Classification Search
CPC ............ G08G 1/0969; G08G 1/0962; G08G 1/096866; G08G 1/096783; G08G 1/161; G08G 1/164; H04L 51/20; H04L 51/38; G06F 2209/545; G06F 1/1647; H04N 21/6582; H04N 21/4788; H04N 1/00145; H04M 1/27455; H04M 1/575; H04M 1/576; H04M 1/72552; H04M 2203/654; H04M 2207/18; H04M 3/42365
See application file for complete search history.

(56) References Cited

U.S. PATENT DOCUMENTS

| | | | | |
|---|---|---|---|---|
| 2009/0144661 A1* | 6/2009 | Nakajima | ............... | G06F 3/048 715/835 |
| 2014/0250191 A1* | 9/2014 | Altman | .............. | G06Q 30/0207 709/204 |
| 2015/0256506 A1* | 9/2015 | Sawato | ................... | H04L 51/38 715/758 |

FOREIGN PATENT DOCUMENTS

| | | |
|---|---|---|
| JP | 2000-099225 | 4/2000 |
| JP | 2005-018423 | 1/2005 |
| JP | 2007-166189 | 6/2007 |

* cited by examiner

*Primary Examiner* — Nizar Sivji
(74) *Attorney, Agent, or Firm* — Rankin, Hill & Clark LLP

(57) ABSTRACT

An electronic device is provided that, while traveling, easily performs message exchange exploiting unit information. An electronic device includes: a display unit; a wireless communication unit that receives information including user information related to a sender and message information desired by the sender to be transmitted to a correspondence party which are sent and received, the user information including identification information for identifying the sender and unit information for identifying an affiliation of the sender; and a display mode control unit that provides a first display position associated with the attribute information in the display unit, and displays at least either of the identification information or unit information by arranging at the first display position.

10 Claims, 27 Drawing Sheets

CONVOY

TRAFFIC INFORMATION

RECEIVED TIME (FROM FRONT-RIGHT CAR)

ONCOMING CAR
(RECEIVED TIME;
ENLARGED)

RECEIVED TIME (FROM FRONT-LEFT CAR)

ONCOMING CAR
(RECEIVED TIME;
ENLARGED)

REFERENCE (OWN CAR);
MOVING TO SOMEWHAT
BEHIND
SMALL OR LARGE

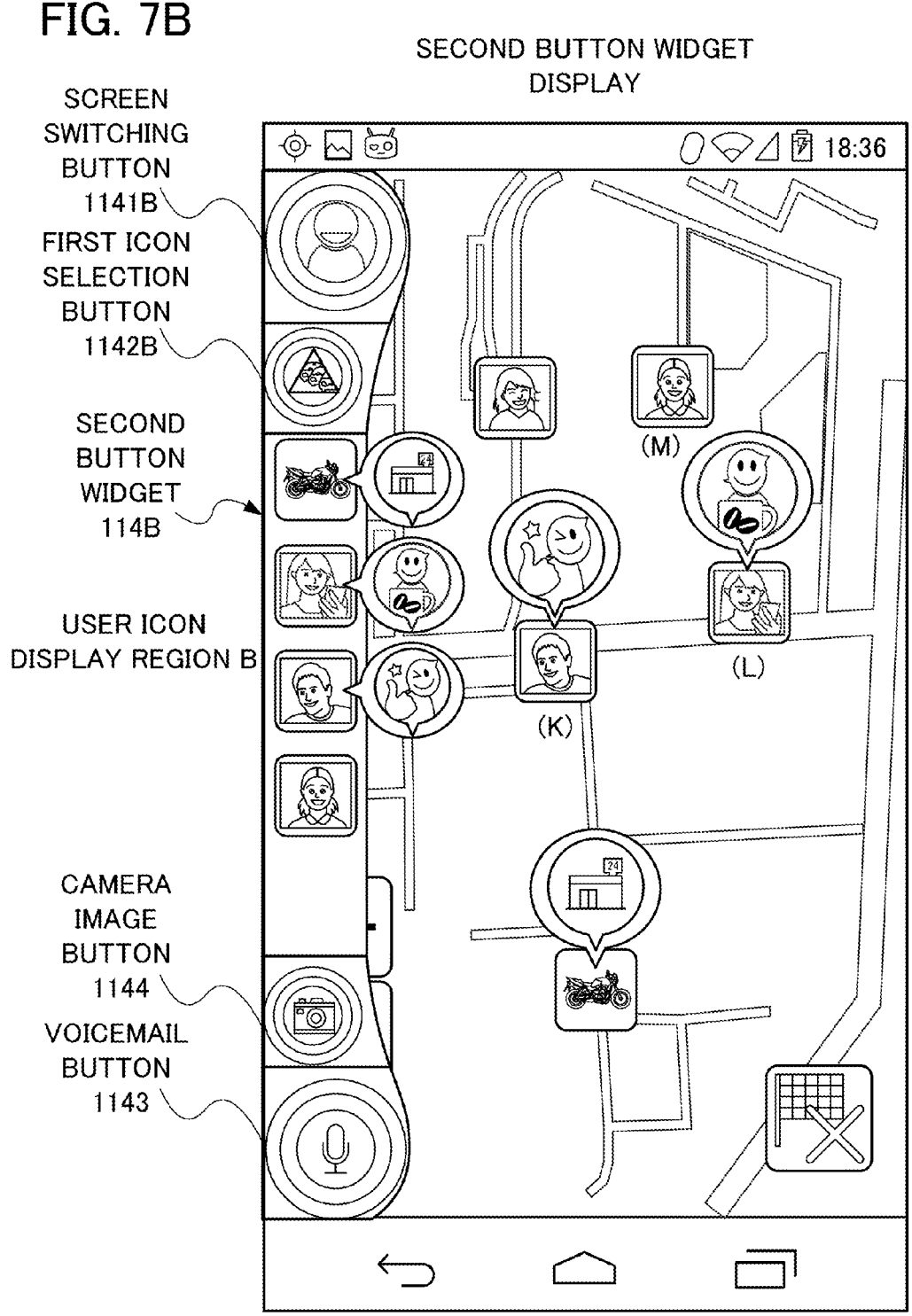

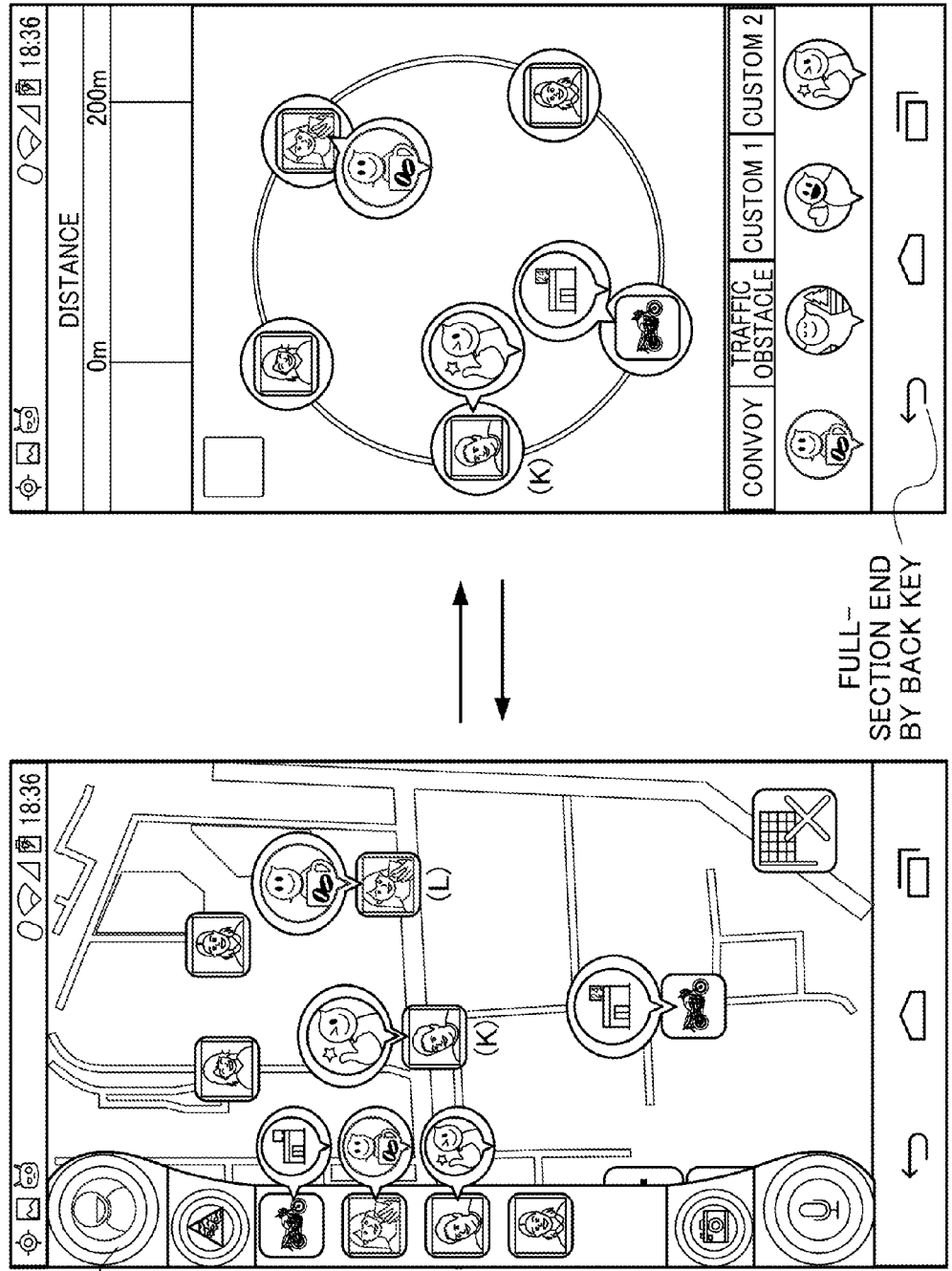

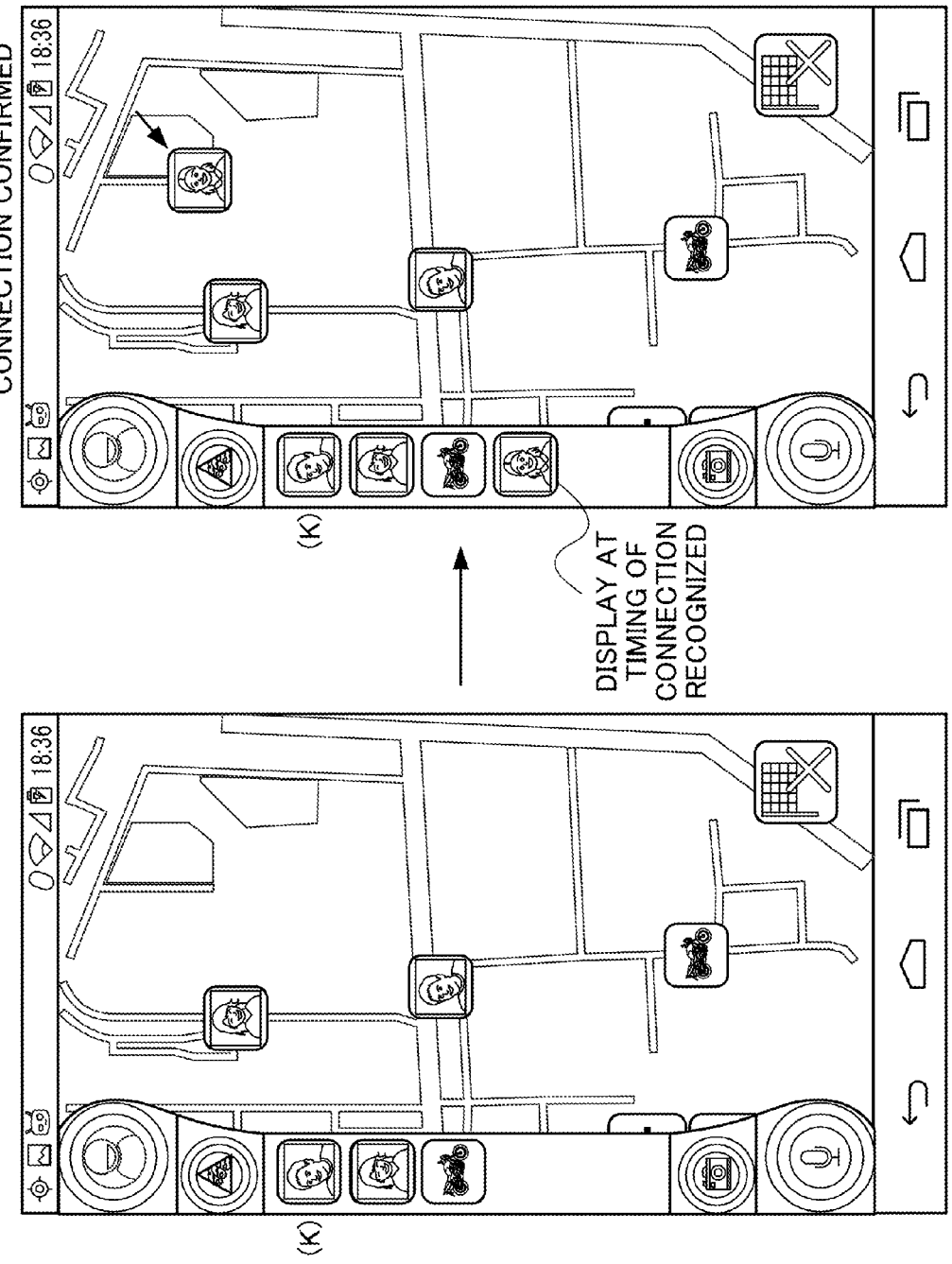

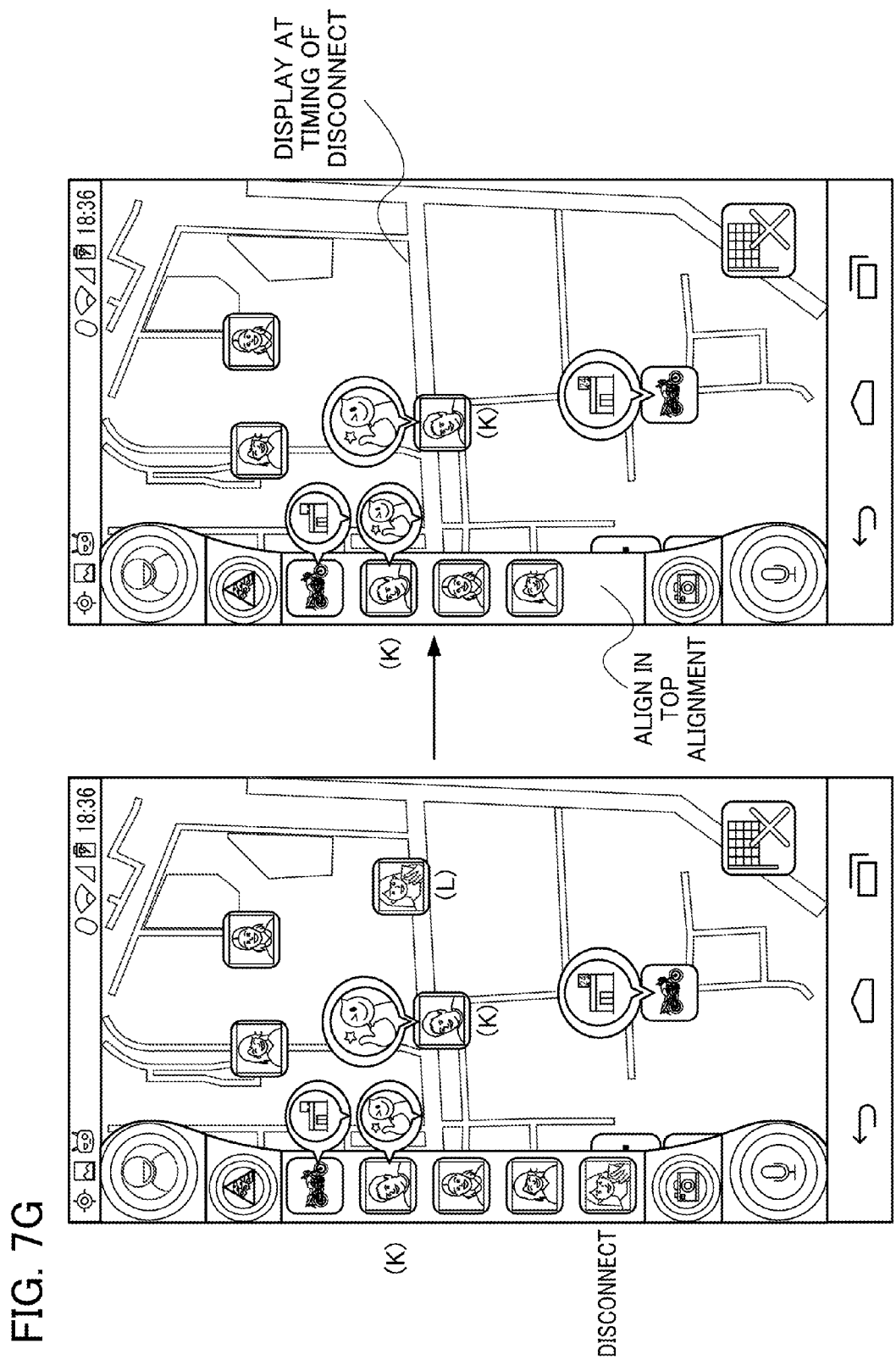

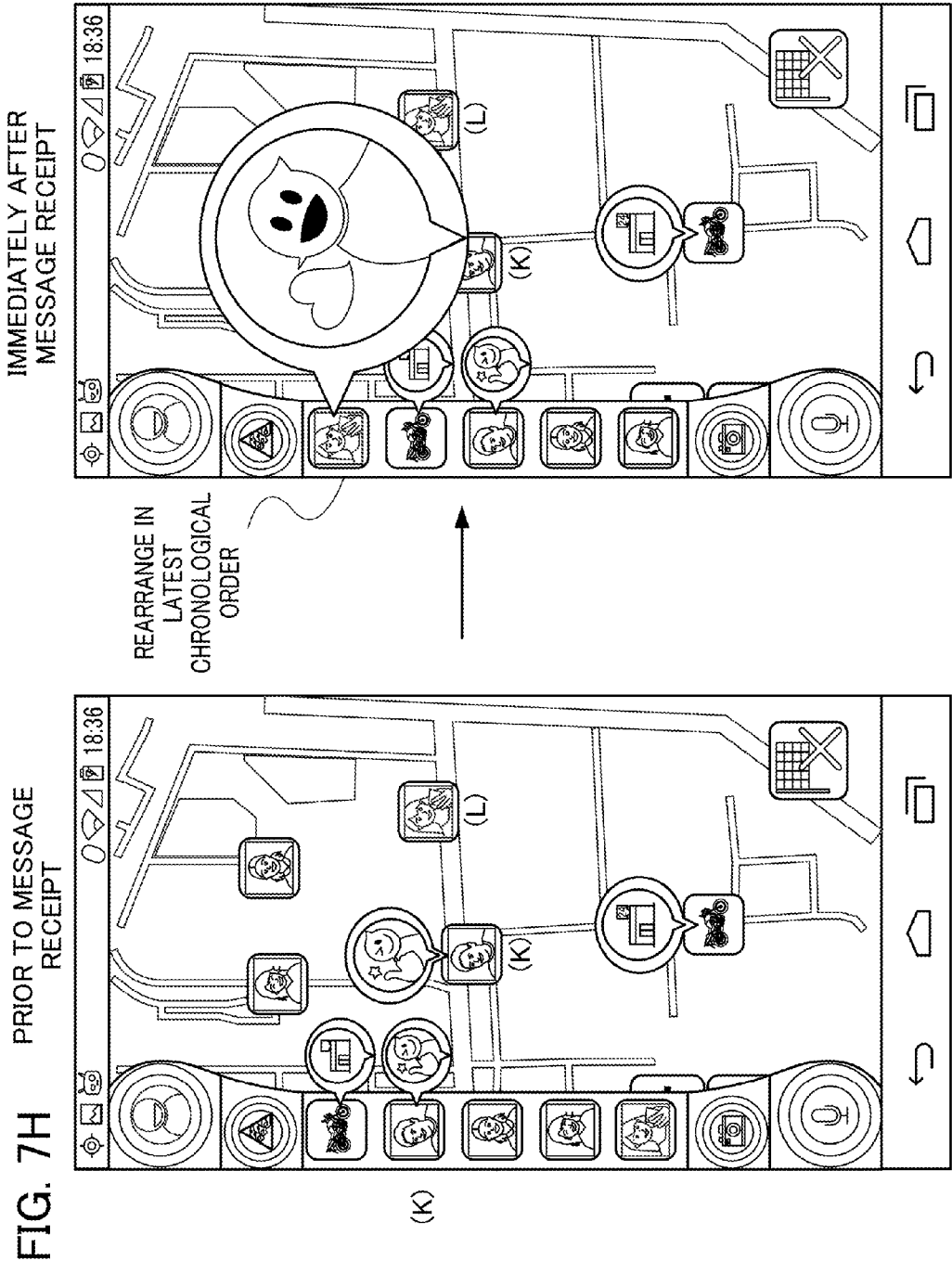

METHOD AND ELECTRONIC DEVICE FOR PERFORMING EXCHANGE OF MESSAGES

This application is based on and claims the benefit of priority from Japanese Patent Application No. 2014-147141, filed on 17 Jul. 2014, the content of which is incorporated herein by reference.

BACKGROUND OF THE INVENTION

Field of the Invention

The present invention relates to a program, method and electronic device for performing communication (exchange of messages) between people moving by transportation means such as vehicles, motorcycles, bicycles traveling on roads, or boats, and/or between electronic devices carried by pedestrians (people) (hereinafter referred to as "mobile device"). Hereinafter, vehicles, motorcycles, bicycles, pedestrians, boats, or the like are also referred to as "vehicles, etc.". For example, as the mobile device, a portable terminal device such as a smartphone, a tablet terminal, PDA (Personal Digital Assistant), notebook computer, mobile telephones, and other portable electronic devices equipped with a wireless communication function possessed by the rider of a transportation means such as a vehicle, or navigation devices including PND (Portable/Personal Navigation Device) and on-board navigation devices can be exemplified. In particular, it relates to a program, method and electronic device for performing exchange of messages whereby a person (user) riding in the vehicle, etc. can perform mutual understanding (interchange of messages) such as a short text exchange-type conversation (so-called chat) by way of character data, by an electronic device by way of an easy operation via wireless communication with another mobile device.

Related Art

There is a demand for a plurality of people, dividing between a plurality of transportation means such as vehicles, wanting to enjoy conversation through wireless communication between people riding in different vehicles.

For example, when touring in a group, there is a demand for setting information of good points for sightseeing in advance in the mobile device, and when coming to this site, achieving a mutual understanding (sending a message) in real time between group members, while looking at the outside scenery. In addition, for example, there is a demand for achieving a mutual understand (sending a message) between group members at a moment having approached a rest area that had been decided beforehand.

In this way, for a short text exchange-type conversation by way of character data, etc. (hereinafter also referred to as "chat"), the acts in themselves of reading/writing and sending/receiving are also the targets of enjoyment, and the number of events transmitted and displayed, types of information included in the transmitted data of one event, and the visibility of these increase the enjoyment.

For this reason, irrespective of the people conversing and people not conversing, a chat is desired that can make an atmosphere in which all of the participants of the chat are present inside the loop of the story to bring about an atmosphere where the conversation is being enjoyed by everyone.

In addition, in a case like doing a certain action together in the group, chat is desired that can provide an atmosphere in which a sense of solidarity in touring by car or motorcycle, etc., a group feeling, and a sense of unity as a community can be enjoyed.

Patent Document 1 discloses an invention related to chat between users (travelling persons) via mobile telephones set to a positional information setting mode. The invention described in Patent Document 1 can make contact even without having contacted a mail address in advance. Then, this invention described in Patent Document 1 provides a chat display screen to a lower portion within a position display screen. The respective positions of a user 0 and users 1 to 3 (icons 500 and 501 to 503) are displayed on a display unit 107 within the position display screen.

Patent Document 2 discloses an invention related to a mobile communication terminal such as a mobile telephone device that realizes a chat function using email. The invention described in Patent Document 2 registers a member participating in a chat in advance to be associated with a member image. By configuring in this way, the complete text of the chat mail is displayed within a chat screen D1 in chronological order along with member images mp1 to mp4 as chat messages. The chat screen D1 is a display screen of a liquid crystal display device built into the mobile telephone device 1.

Patent Document 3 describes an invention related to an information processing device that makes an association between a virtual living object (avatar) that is an alter ego of the user and chat text, in virtual space. The invention described in Patent Document 3 provides a serif data display area 151 within the screen of a wide screen 140 serving as virtual space, displays a balloon at a position corresponding to an avatar therein, and inside thereof, has the text of chat displayed.

Patent Document 1: Japanese Unexamined Patent Application, Publication No. 2007-166189
Patent Document 1: Japanese Unexamined Patent Application, Publication No. 2005-18423
Patent Document 1: Japanese Unexamined Patent Application, Publication No. 2000-99225

SUMMARY OF THE INVENTION

The invention described in Patent Document 1 requires all characters to be read in order to understand who the sender of this message is, and what the contents thereof are, since both the sender and the message are displayed as text. However, in the invention described in Patent Document 1, since messages are displayed chronologically, assuming that one user continuously sends out messages many times, for users other than this, a message, not to mention the name of the user thereof, will not be displayed in any way, and thus the presence of persons not conversing will be weak. In addition, the information displayed is simply aligned chronologically as a row; therefore, it is also poor in variation mechanically.

Furthermore, with the invention described in Patent Document 1, the information displayed is in personal units, there is no information relating to the individual people participating in the chat, and unit information like who is riding in the same vehicle with who, who and who are family members, and who is in a group going to the same destination with who is unclear, and thus a feeling of solidarity as a group unit and sense of unity are not provided.

The invention described in Patent Document 2 displays the image of a caller that has been photographed in advance; therefore, it is possible to easily determine who the message sender is. However, also in the invention described in Patent Document 2, since messages are displayed chronologically, assuming that one member continuously sends out messages many times, for members other than this, a message, not to mention the member image thereof, will not be displayed in any way, and thus the presence of members not conversing will be weak.

Furthermore, even with the invention described in Patent Document 2, transmitted messages simply form a row of character strings, and thus is poor in variation mechanically and impersonal, and thus it has not been possible to enjoy conversations other than character messages. Furthermore, similarly to Patent Document 1, in the case of Patent Document 2, the information displayed is in private units, and there is no unit information relating to the individual persons participating in the chat, and thus a feeling of solidarity and sense of unity as a group unit are not provided.

The invention described in Patent Document 3 is a game console, and the game itself is made by participation of users. Therefore, the avatar acts along the rules of the game, and does not provide a feeling of solidarity or sense of unity as a group, for example. Furthermore, similarly to Patent Document 1, also in the case of Patent Document 3, the information displayed is in private units, there is no unit information relating to the individual persons participating in the chat, and thus enjoyment, a feeling of solidarity and sense of unity as a group unit are not provided.

The present invention has been made by taking account of such problems, and upon providing a program, method and electronic device that, upon making a conversation of chat format by way of character data, make an atmosphere in which even people not conversing are present inside the loop of a story, while being in a communication connection state, thereby bringing about an atmosphere where the conversation is being enjoyed by everyone to perform message exchange in an enjoyable manner, and has an object of providing a program, method and electronic device whereby the display of unit information particularly suited to small screens is possible due to being made taking account of the above-mentioned such problems, and being configured so as to display a user to be associated with a group unit to which this user belongs.

In addition, it has been made taking account of the above-mentioned such problems and has an object of providing a program, method and electronic device whereby the display of unit information particularly suited to small screens is possible, upon providing a program, method and electronic device that, upon making a conversation of chat format by way of character data, make an atmosphere in which even people not conversing are present inside the loop of a story, thereby bringing about an atmosphere where the conversation is being enjoyed by everyone to perform message exchange in an enjoyable manner.

By configuring in this way, it has an object of providing a program, method and electronic device that can facilitate imagining the situation of the sender (speaker), and thus aid in understanding of the received message information, by intuitively understanding the unit information such as the vehicle in which a sender is riding, family to which the sender belongs, destination headed by the sender, for example, from the viewpoint of the receiver, collectively with the message information from the sender.

According to a first aspect of the present invention, in method for an electronic device (e.g., the electronic device 2 described later) including a display unit (e.g., the display unit 11 described later) and a wireless communication unit (e.g., the wireless communication unit 20 described later) to display information including user information related to a sender and message information desired by the sender to be transmitted to a correspondence party which are sent and received via the wireless communication unit, the user information includes identification information of the sender and attribute information of the sender; the method including a display mode control step of the electronic device providing a first display position (e.g., the unit display region 112A and member display region 112B described later) associated with the attribute information to the display unit, and displaying at least either of the identification information or the attribute information by arranging at the first display position.

According to the method of the first aspect, since the senders (speakers) are organized and displayed based on unit information, in addition to information of "who is the sender (speaker)", it is thereby possible to intuitively understand information like "to which unit does the sender (speaker) belong" (e.g., riding in which car, belonging to which family, belonging to a unit going to which destination). By configuring in this way, it is possible to facilitate imagining the situation of the sender (speaker), and thus aid in understanding of the received message information.

According to a second aspect of the present invention, in the method as described in the first aspect, the display mode control step further includes: a step of setting a plurality of the first display positions (e.g., the unit display region 112A and member display region 112B described later) respectively associated with a plurality of attribute information in the display unit (e.g., the display unit 11 described later); and a step of simultaneously displaying at least either of the identification information or the attribute information of each sender, sent and received from a plurality of senders, by arranging at any of the plurality of first display positions.

Similar effects as the method of the first aspect are exerts according to the method of the second aspect.

According to a third aspect of the present invention, in the method as described in the first or second aspect, the display mode control step includes:

a step of displaying at least either of identification information of an own device user or attribute information of the own device user as an icon (e.g., the member icon or unit icon described later), by providing a first display position (e.g., the unit display region 112A and member display region 112B described later) associated with the attribute information of the own device user and arranging therein; and a step of setting one other first display position with reference to the first display position associated with the attribute information of the own device user, and displaying at least either of identification information of a sender or attribute information of a sender other than the own device user as an icon, by arranging in the other first display position.

According to the method of the third aspect, since the unit information is displayed by making into an icon (hereinafter also referred to as "unit icon"), together with displaying the sender (speaker) by making into an icon (hereinafter also referred to as "member icon"), the display of the sender (speaker) is organized, and visibility improves, whereby it is possible to render pleasure in the conversation itself.

According to a fourth aspect of the present invention, in the method as described in the third aspect, the display mode control step includes: a step of assigning a display region for displaying the icon to a plurality of divided display regions based on a number of electronic devices connected with the own device including the own device user; a step of displaying at least either of identification information (e.g., the member information described later) of the own device user or attribute information (e.g., the unit information described later) of the own device user as an icon (e.g., the unit icon or member icon described later), by providing a first display position (e.g., the unit display region 112A and member display region 112B described later) associated with the attribute information of the own device user in one of the divided display regions among the plurality of divided display regions thus assigned, and arranging therein; and a step of displaying as an icon at least either of identification information of each sender other than the own device user or attribute information of an affiliation of the sender, with reference to the first display position associated with the attribute of the own user, by respectively providing, and arranging therein, a first display position associated with the attribution information of each of the senders to the respective divided display regions other than a first display position associated with attribute information of the own device user that has been set.

According to the method of the fourth aspect, since display positions of unit icons and member icons are assigned based on the number of devices making communication connection, in the case of a new device (user) making communication connection, and a case of a device (user) that had made communication connection exiting from the chat by disconnecting the communication connection, each time it is possible to dynamically rearranging the unit icons and member icons. Furthermore, since the arrangement positions of unit icons or member icons change in response to fluctuation in the number of communication connections, the change on the screen is great, and thus the matter of the connections increasing or decreasing is easily understood intuitively.

According to a fifth aspect of the present invention, in the method as described in any one of the first to third aspects, the display mode control step includes: a step of dividing a display region for displaying the icons by any number set in advance to establish a plurality of divided display regions; and a step of providing a first display position (e.g., the unit display region 112A and member display region 112B described later) associated with the attribute information of the sender in each of the divided display regions among the plurality of divided display regions, and displaying at least either of the identification information of the sender or the attribute information of the sender by arranging in the first display position.

According to the method of the fifth aspect, since the arrangement pattern of the unit icons and member icons is decided in advance (position at which to be manifested are fixed), the screen is organized irrespective of how connected, and information tends to be understood intuitively. In addition, other than an arc, it is possible to perform arrangement based on tile display, for example.

According to a sixth aspect of the present invention, in a method for an electronic device (e.g., the electronic device 2 described later) including a display unit (e.g., the display unit 11 described later) and a wireless communication unit (e.g., the wireless communication unit 20 described later) to display on the display unit information including user information related to a sender and message information desired by the sender to be transmitted to a correspondence party which are sent and received via the wireless communication unit, the user information includes identification information (e.g., the user information described later) of the sender and attribute information (e.g., the unit information described later) of the sender, and the method includes a display mode control step of the electronic device displaying the identification information of the sender to be associated with the attribute information, in a case of displaying the attribute information of the sender on the display unit, and sending at least the information.

According to the method of the sixth aspect, in addition to the display of unit information to which the sender belongs, it becomes possible to intuitively understand who speaks since the user information of this sender is displayed during message receipt from this sender (during speaking). In the case of no speaking, since the user information of the sender is not being displayed, the display region can be organized to facilitate viewing. Furthermore, since the unit information to which the sender belongs is displayed as a representative even when there is no speaking, it is possible to recognize the existence as the unit thereof.

According to a seventh aspect of the present invention, in the method as described in any one of the first to sixth aspects, the wireless communication unit (e.g., the wireless communication unit 20 described later) performs direct wireless communication.

According to the method of the seventh aspect, it has the effect not requiring communication expenses and making inexpensive because of being by direct wireless communication.

According to an eighth aspect of the present invention, a computer program causes each step of the method as described in any one of the first to seventh aspects to be executed in a computer of an electronic device (e.g., the electronic device 2 described later) including a display unit (e.g., the display unit 11 described later) and a wireless communication unit (e.g., the wireless communication unit 20 described later).

Similar effects as the method of the first aspect are exerted according to the program of the eighth aspect.

According to a ninth aspect of the present invention, an electronic device (e.g., the electronic device 2 described later) includes: a display unit (e.g., the display unit 11 described later); a wireless communication unit (e.g., the wireless communication unit 20 described later) that receives information including user information related to a sender and message information desired by the sender to be transmitted to a correspondence party that is sent and received, the user information including identification information of the sender and attribute information of the sender; and a display mode control unit that provides a first display position (e.g., the unit display region 112A and member display region 112B described later) associated with the attribute information in the display unit, and displays at least either of the identification information or attribute information by arranging at the first display position.

Similar effects as the method of the first aspect are exerted according to the electronic device of the ninth aspect.

According to the present invention, upon making a conversation of chat format by way of character data, an atmosphere of persons not speaking also being present inside the loop of the story is made, whereby it is possible to bring about an atmosphere where the conversation is being enjoyed by everyone and perform the exchange of messages in an enjoyable manner.

In addition, according to the present invention, in the case of doing a certain activity together in a group such as touring by car or motorcycle, etc., it is possible to create an atmosphere in which a feeling of solidarity of the group, group feeling, and sense of unity as a community can be enjoyed.

Furthermore, according to the present invention, it is possible to facilitate imagining the situation of the sender, and thus aid in understanding of the received message information, by intuitively understanding the unit information such as the vehicle in which a sender is riding, family to which the sender belongs, destination headed by the sender, for example, from the viewpoint of the receiver, collectively with the message information from the sender.

BRIEF DESCRIPTION OF THE DRAWINGS

FIG. 7B is a view showing a display example displaying a second button widget 114B on the second display (map display) of the second embodiment;

FIG. 7E is a view showing an operation example related to switching between the second display (map display) and first display (full-screen display) of the second embodiment;

FIG. 7F is a view showing a display example in which member icons are dynamically additionally arranged on the map display, in a case of there being connection of a new mobile device, on the second display (map display) of the second embodiment;

FIG. 7G is a view showing an example of member icons becoming non-display on the map display, in a case of a connected mobile device having disconnected, on the second display (map display) of the second embodiment;

FIG. 7H is a view showing a display example of a text message, in a case of receiving this text message, on the second display (map display) of the second embodiment.

DETAILED DESCRIPTION OF THE INVENTION

First Embodiment

Hereinafter, a preferred embodiment of an electronic device of the present invention will be explained while referencing the drawings. First, an electronic device according to a first embodiment will be explained by referencing FIG. 1.

(Functional Configuration of Electronic Device According to First Embodiment)

A vehicle, etc. according to the first embodiment indicates an own vehicle 1 that travels on roads, and other vehicles, motorcycles, bicycles, pedestrians, as well as boats, etc.

It should be noted that an identification ID for uniquely identifying the electronic device is assigned to electronic devices equipped to vehicles, etc. (or carried, or present inside) (hereinafter also referred to as "mobile device"), and it is possible to identify whether the electronic device is equipped to a vehicle, etc. that is a vehicle, motorcycle, boat, bicycle or pedestrian according to the identification ID.

The electronic device 2 according to the first embodiment includes navigation devices including an on-board navigation device, PND (Personal Navigation Device), or the like, portable terminal devices such as smartphones, a tablet terminal, a PDA, a notebook computer, a mobile telephone and other portable electronic devices equipped with a wireless communication function. In particular, it is suited to electronic devices provided with a small screen display having a screen size within 10 inches, and particularly no more than 7 inches. However, it can also be applied to electronic devices provided with a display having a screen size of 10 inches or more.

It should be noted that, in the case of the vehicle, etc. being a bicycle or pedestrian, the electronic device 2 is configured to include a portable terminal, etc. (smartphone, etc.).

Figure 1:
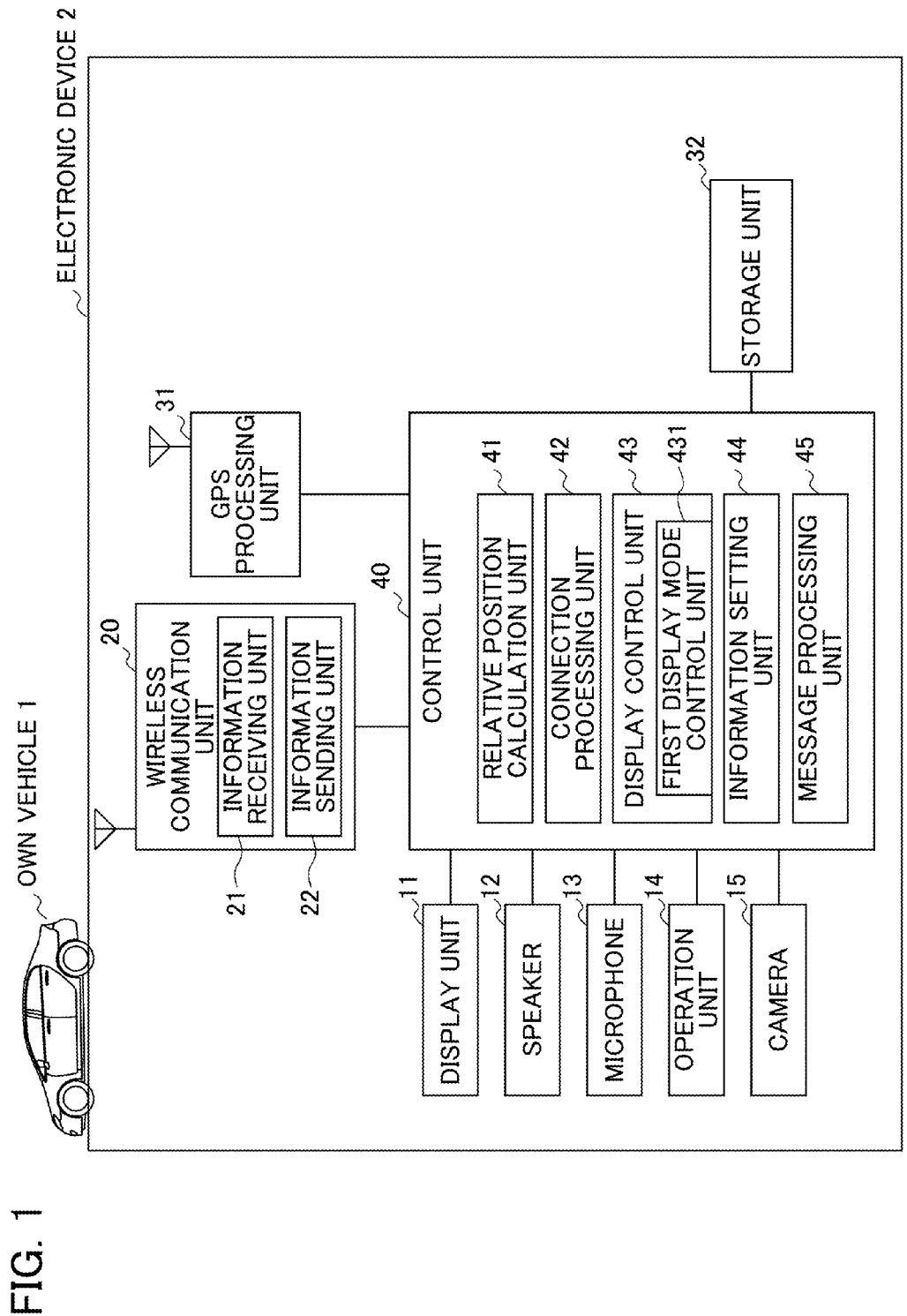
FIG. 1 is a block diagram showing the functional configuration of an electronic device 2 of a first embodiment.

The functional configuration of the electronic device 2 according to the first embodiment of the present invention will be explained by referencing FIG. 1. FIG. 1 is a functional block diagram showing the functional configuration of the electronic device 1 equipped to the vehicle, etc. according to the first embodiment.

The electronic device 2 carried by the vehicle, etc. according to the first embodiment (hereinafter also referred to as "mobile device" or simply "own device" unless otherwise stated) is configured to include a control unit 40, wireless communication unit 20, GPS receiver, GPS processing unit 31, storage unit 32, display unit 11, speaker 12, microphone 13, operation unit 14 and camera 15, and is carried in a mobile means such as a vehicle.

Message Exchange

As the stylized (and fixed) phrase message exchanged between the own device and an electronic device carried by another vehicle, etc. (hereinafter also referred to as "other mobile device" or simply "other device" unless otherwise stated), for example, when any group members make a touring drive in a plurality of vehicles, there are proposal messages such as "restroom break", "coffee time", "convenience store" and "rest" and reply messages such as "roger" relative to these, and reply messages such as "thank you" conveying an expression of gratitude in the interaction with a party, and proposal messages such as a change of destination among the group, reply messages relative to this, and the like, interchanging in real-time with the cars of group members.

In addition, for example, there are stylized (and fixed) phrase messages related to greetings such as "hello", and advance unseen traffic obstacles from oncoming vehicles, etc.

In addition, for example, at intersections, etc., there are stylized (and fixed) phrase messages (e.g., stylized (and fixed) phrase message such as "crossing") of a pedestrian present notification, notification of road crossing, or the like.

It should be noted that, as the messages exchanged between the own device and other device, other than stylized (and fixed) phrase messages, for example, it is possible to include messages such as camera images, text messages and voicemail. It should be noted that the camera images, text messages, etc. can be displayed within frames.

The messages exchanged between the own device and other device, in addition to message information, can include the identification ID for uniquely identifying the own device and other mobile devices, GPS information, time information, profile information (referred to as "user information") related to the sender (user), information classification, information urgency and information importance. Herein, the profile information related to the sender (user) can include identification information (also referred to as "member information" or "personal information") of the sender (user), attribute information ("also referred to as "unit information") of the sender (user), etc. In the case of the sender riding in a vehicle, it is possible to include vehicle model information of this vehicle.

(Attribute Information (Unit Information))

Attribute information (unit information) of the sender (user) is information indicating to which group the sender (user) belongs. As examples of attribute information (unit information) of the sender (user), the vehicle ridden by the sender (user) can be exemplified.

For example, in the case of a plurality of users going out touring by riding separately in a plurality of vehicles, by setting the attribute information (unit information) of the user as the ridden vehicles of the users, in the case of performing chatting while touring, it is possible to display to be sorted based on the vehicle ridden by the sender (speaker).

By configuring in this way, it is possible to intuitively understand in which vehicle the sender (speaker) is riding, in addition to information of "who is the sender (speaker)". While chatting, it is possible to facilitate imagining the situation of the sender (speaker), and thus aid in understanding of the received message information.

It should be noted that the attribute information (unit information) is not limited to the vehicle. For example, in the case of touring, etc. with a plurality of families, it is possible to define each "family" as the unit information. In addition, in the case of a plurality of groups having different final destinations touring, etc., it is possible to define the "final destination" as the unit information. In this way, the unit information can be set according to the time, place, situation, etc., in the case of grouping a plurality of senders.

Hereinafter, if not particularly stated, the information will be collectively referred to as "communication information".

The wireless communication unit 20, in the case of sending/receiving with another mobile device, for example, in a case of sending/receiving with a server WiFi direct communication enabling 1:N communication or 1:1 communication, it is possible to implement a plurality of communication protocols so as to be able to make communication such as WiFi access point connection or 3G/LTE ($3^{rd}$ Generation/Long Term Evolution).

By WiFi direct communication, the own device can make direct wireless communication with other mobile devices in the surroundings that are within a communicable area about 100 m away. In addition, with the mobile device within the communicable area as an access point, it is possible to make wireless communication with other mobile devices that are within the communicable area of this mobile device. By configuring in this way, for example, it becomes possible for the own device to expand the communicable area.

In addition, the own device is configured to be able to perform wireless communication with a server such as a VICS (registered trademark) center or navigation server, for example, by way of WiFi access point connection, 3G/LTE, etc. The wireless communication unit 20 can receive data such as map information and traffic information, for example, from such a server.

It should be noted that the communication protocol possessed by the wireless communication unit 20 is not limited to WiFi direct communication, WiFi access point connection or 3G/LTE. The wireless communication unit 20 may possess a communication protocol enabling 1:1 communication and 1:N communication for directly sending/receiving with another mobile device, and a communication protocol for sending/receiving with servers, etc.

The wireless communication unit 20 has an information receiving unit 21 that receives communication information from another mobile device, and an information sending unit 22 that sends communication from the own device to another mobile device.

The GPS processing unit 31 receives radio waves including positioning data containing the latitude/longitude of the current site from a plurality of GPS satellites via the GPS receiver (not illustrated), and calculates the current position of the own device based on the positioning data and map information of a currently traveled road.

Display Unit

The display unit 11 is configured, for example, by a liquid crystal display, etc. provided at a main body front face of the electronic device 2 such as a smartphone, and can display various icons, etc. expressing communication information to the user according to a display control unit 43 described later.

Next, it will be explained how various information is displayed by icons are displayed on the display unit 11. It should be noted that the display on the display unit 11 explained hereinafter is controlled by the display control unit 43 described later.

(Message Icon)

The stylized (and fixed) phrase message, for example, plurality of stylized (and fixed) phrase messages such as communication information among peers such as proposal messages of "restroom break", "coffee time", "convenience store", "rest", etc. and reply messages such as "roger" to the proposal message; a message conveying an expression of gratitude such as "thank you" to convey the expression of gratitude in the interaction with another party; greetings such as "hello"; and "traffic obstacle information" like "upcoming traffic delay"; are associated with an icon expressing as a message symbol (hereinafter also referred to as "message icon").

Figure 3:
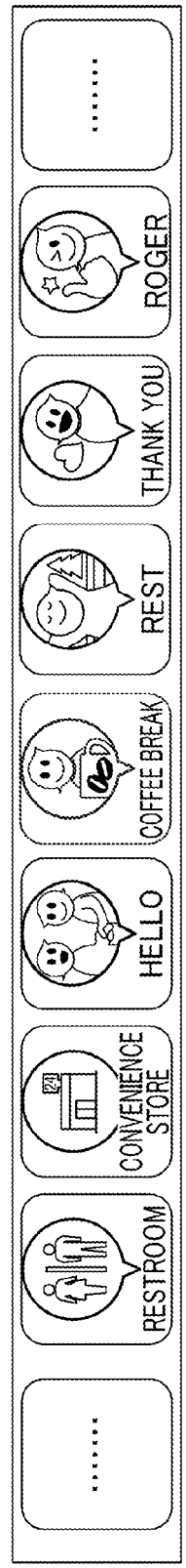
FIG. 3 is a view showing examples of message icons.
Figure 3:
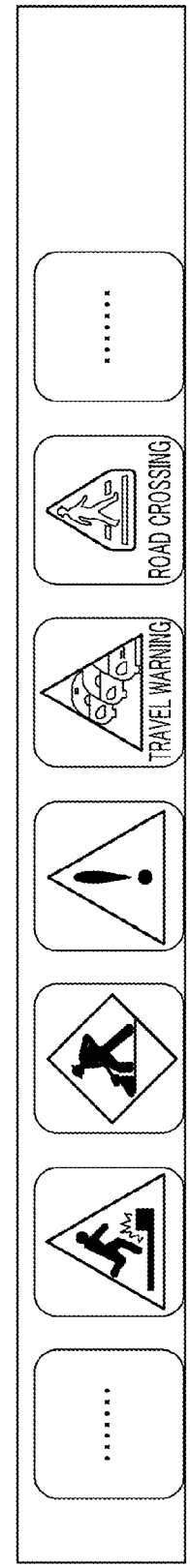
Figure 4A:
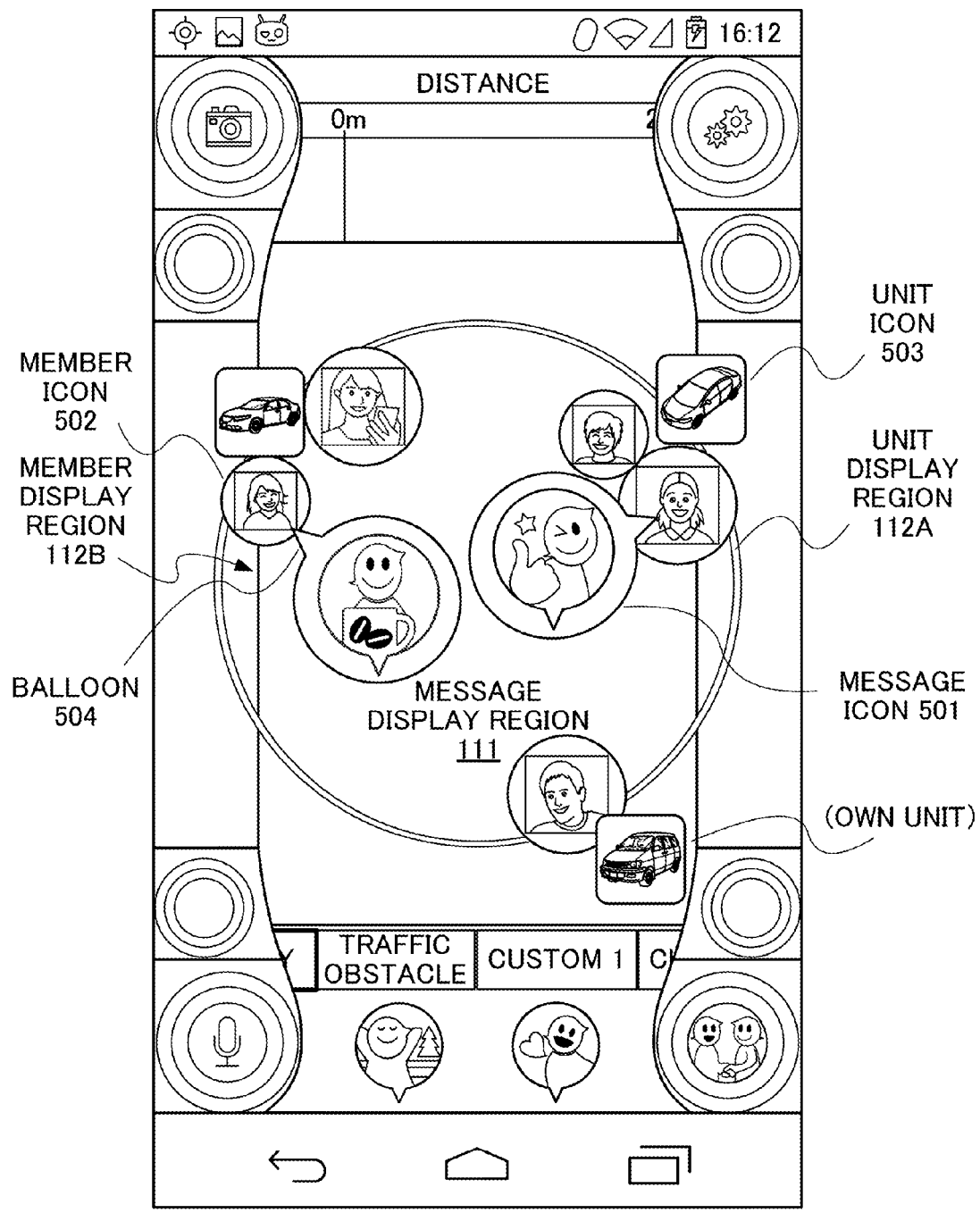
FIG. 4A is a view showing a display example of an arrangement pattern A of the first embodiment.

By configuring in this way, it is possible to simplify the display of a stylized (and fixed) phrase message received via the wireless communication unit 20, for example, as shown in FIG. 4A as the message icon 501. It should be noted that examples of message icons are shown in FIG. 3.

In addition, as a message exchanged between the own device and other device, for example, it is possible to include messages such as camera images, text messages and voice-mail. In this case, the camera image, text message, etc. can be a framed image display or framed character display of a fixed form decided in advance in a certain size.

(Effects of Message Icon)

By configuring in this way, for example, it is possible to exert the following such effects.

(1) When displaying a text message as is, it is not intuitively understood and requires reading; whereas, due to being a figure or graphical, intuitive understanding is possible.

(2) In the case of displaying a text message as is, although the coverage area overhangs to the screen center side, in the case of a message of an icon representation, due to being able to set to a constant size, it is possible to suppress the overhanging by this amount.

(3) By preparing message icons as sender/receiver common patterns, storing and saving these in each device, using not the image data itself in the communication data, but rather identification information, and displaying by calling the data stored on the receiver side based on this, it is possible to lighten the sent/received data by this amount, which is convenient in communication, especially short-distance wireless direct communication.

(Member Icon)

As shown in FIG. 4A, for example, in the case of expressing on the display unit 11 with the identification information of the sender (user) participating in the chat as a character, the character is referred to as member icon 502. The mobile device used by this sender can be expressed by a member icon representing this sender.

Hereinafter, unless particularly stated, the member icon will be explained with the face of the user as an example; however, the member information is not limited to the face of the user. For example, the design of a car may be set as the member icon.

(Unit Icon)

In the case of expressing on the display unit 11 with the attribute information (unit information) of the sender (user) participating in the chat as a character, this character is referred to as unit icon. For example, in the case of defining the attribute information (unit information) of this sender as the ridden vehicle, it is possible to express by the unit icon representing this vehicle. In the present embodiment, it will be explained with the unit icon representing the vehicle as an example.

In this way, among the user information of the sender (user), it is possible for the identification information of the user ("member information") to be expressed by the member icon, and the attribute information of the user ("unit information") to be expressed by the unit icon.

Hereinafter, both the member icon and unit icon are also referred to as user icon. In other words, the user icon indicates either the member icon or the unit icon, or both.

The user icon (member icon and unit icon) can be registered in advance using a setting screen displayed by depressing a setting button 1142 described later. The user can set the user icon by using a template created in advance. In addition, it is also possible for the user to create.

Then, in the case of the user registering the face of a person in the member icon, the face of the person registered as the member icon will be displayed on the display unit 11. In addition, in the case of the user registering a car as the unit icon, the car registered as the unit icon will be displayed on the display unit 11.

The user icon corresponding to the mobile device that is the sending source of a message and the message icon corresponding to this message can be made so as to display to be correlated by the balloon 504, as shown in FIG. 4A, for example.

(Full-Screen Display)

Next, the arrangement pattern upon displaying the message icons and user icons on the display unit 11 will be explained.

In the present embodiment, upon performing chatting, the user icons and message icons are displayed using the entire screen of the display unit 11. Hereinafter, the display mode thereof will be explained.

(Message Display Region, Unit Display Region and Member Display Region)

First, the display region for displaying message information (message icons) is referred to as the message display region 111, the display region for displaying unit information (unit icons) is referred to as the unit display region 112A, and the display region for displaying member information (member icons) is referred to as the member display region 112B.

Hereinafter, both the unit display region 112A and member display region 112B are also referred to as the user display region 112. In other words, the user display region 112 indicates either of the unit display region 112A or member display region 112B, or both thereof.

In the present embodiment, an arrangement patterns in the case of displaying a message icon and user icon on the display unit 11 are common in the point of displaying the identification information (member information) of the user to be associated with attribute information (unit information) of this user.

In FIGS. 4A to 4I exemplified hereinafter, the picture of a person is used as the member information (e.g., member icon), and the picture of a vehicle is used as the unit information (e.g., unit icon). However, the member icon is not limited to the picture of a person and the unit icon is not limited to the picture of a vehicle. It is possible to set any picture.

It should be noted that, upon display of the unit icon and member icon, for example, it is possible to display to distinguish between both by setting the background color of the unit icon and/or color of the periphery of the icon, etc. to different colors than that of the member icon.

Next, three arrangement patterns upon displaying unit icons, member icons and message icons on the display unit 11 will be explained.

Among the three arrangement patterns, it is possible to set in advance by way of an information setting unit 44 described later in which arrangement pattern to display on the display unit 11.

Arrangement Pattern A

An arrangement pattern A is shown in FIG. 4A.

As shown in FIG. 4A, the arrangement pattern A has a characteristic in the point of providing three display regions that are triple rings.

The unit display region 112A for displaying the unit icon 504 is provided at the outermost periphery. At an inner side thereof, the member display region 112B for displaying the member icon 502 is provided in an arc or circumference shape, and further, at an inner side thereof, the message display region 111 that displays message information (message icon 501) is provided at the center of the display unit 11. The unit icon 503, member icon 502 and message icon 501 are displayed in a concentric fashion in this way.

By configuring in this way, the member icon displayed in the member display region 112B associated with the unit display region 112A comes to be displayed adjacent to the unit icon that is the attribute information of this member. Then, it is possible to display so that the identification information (member icons) of the users displayed in the respective member display regions 112B surrounds the message display region 111.

It is thereby possible for the member icons of all of the users for which the attribute information of the user is the same unit information (unit icon) to render a collective feeling as the same unit group.

(Arrangement Locations of Unit Icon and Member Icon)

The unit icons to which users (mobile device) participating in the chat (i.e. in a currently communicable state) are associated can be arranged on the unit display region 112A with predetermined intervals by way of the first display mode control section 431 described later.

For example, letting the number of unit icons currently displayed be n(>1), it is possible to divide the circumference-shaped user display region 112 into n number of regions, by the angle θ1 shown in formula (1). It is possible to arrange n number of unit icons at equal intervals in the respective n number of divided display regions, since a different unit icon is associated to each.

$$\theta 1 = 360°/n \quad \text{(formula (1))}$$

In addition, in each of the n number of divided display regions, due to being assigned to regions made by dividing the member display region 112B into n numbers, it is possible to arrange the member icons of users for which the attribute information of the user is the same unit information (unit icon) into divided display regions adjacent to this unit icon.

By configuring in this way, it becomes possible to associate each of the n number of divided display regions adjacently to the respective n number of unit icons.

It should be noted that, in the case of establishing the vehicle as the unit, due to the capacity being decided in the vehicle, the maximum number of users associated with a vehicle unit becomes a fixed number. In the case of the maximum number of member icons associated with each unit icon being set in advance in this way, the regions displaying the member icons associated with each unit icon can be appropriately prepared by dividing the circumference-shaped member display region 112B in proportion to the maximum number of member icons associated with each unit icon.

(Arrangement Location of User Icon of User of Own Device)

In the arrangement pattern A, it is preferable to intuitively distinguish between the user icon corresponding to the user making communication using the own device (hereinafter also referred to as "user icon corresponding to own device"), and user icons correspond to other devices (unit icon and member icon).

For this reason, in the arrangement pattern A, it is possible to display the user icon corresponding to the own device (unit icon and member icon) in the user display region 112, which is arranged below the center of the display unit 11, for example.

It should be noted that the location at which arranging the user icon corresponding to the own device (unit icon and member icon) is not limited to below the center of the display unit 11. For example, it may be arranged to the left of center. By way of the information setting unit 44 described later, it is possible to set to any location.

(Dynamic Arrangement)

In the case of communication connection with a new mobile device being established via the wireless communication unit 20, and the attribute information (unit information) of the user of this mobile device corresponding to a non-display unit icon, it is possible to add a new unit icon and dynamically rearrange on the unit display region 112A including the unit icons already display, by way of the first display mode control section 431 described later.

Then, in accordance with the rearrangement of unit icons, the first display mode control section 431 described later can dynamically rearrange the member icons of users of all of the mobile devices participating in the chat to be adjacent to the respective unit icons associated with this member icon.

(Member Icon)

The first display mode control section 431 can display a member icon to be small, or make superimposed display or non-display, so that each member icon fits into the member region member 113 normally. Then, in a case of receiving a message from a user, i.e. in a case of the user speaking, the first display mode control section 431 can emphasize that a new message has been sent from this user by displaying this member icon to be large. Subsequently, this user icon is displayed to be small, or made to superimpose display or non-display, after a predetermined time elapse.

Arrangement Pattern B

Figure 4B:
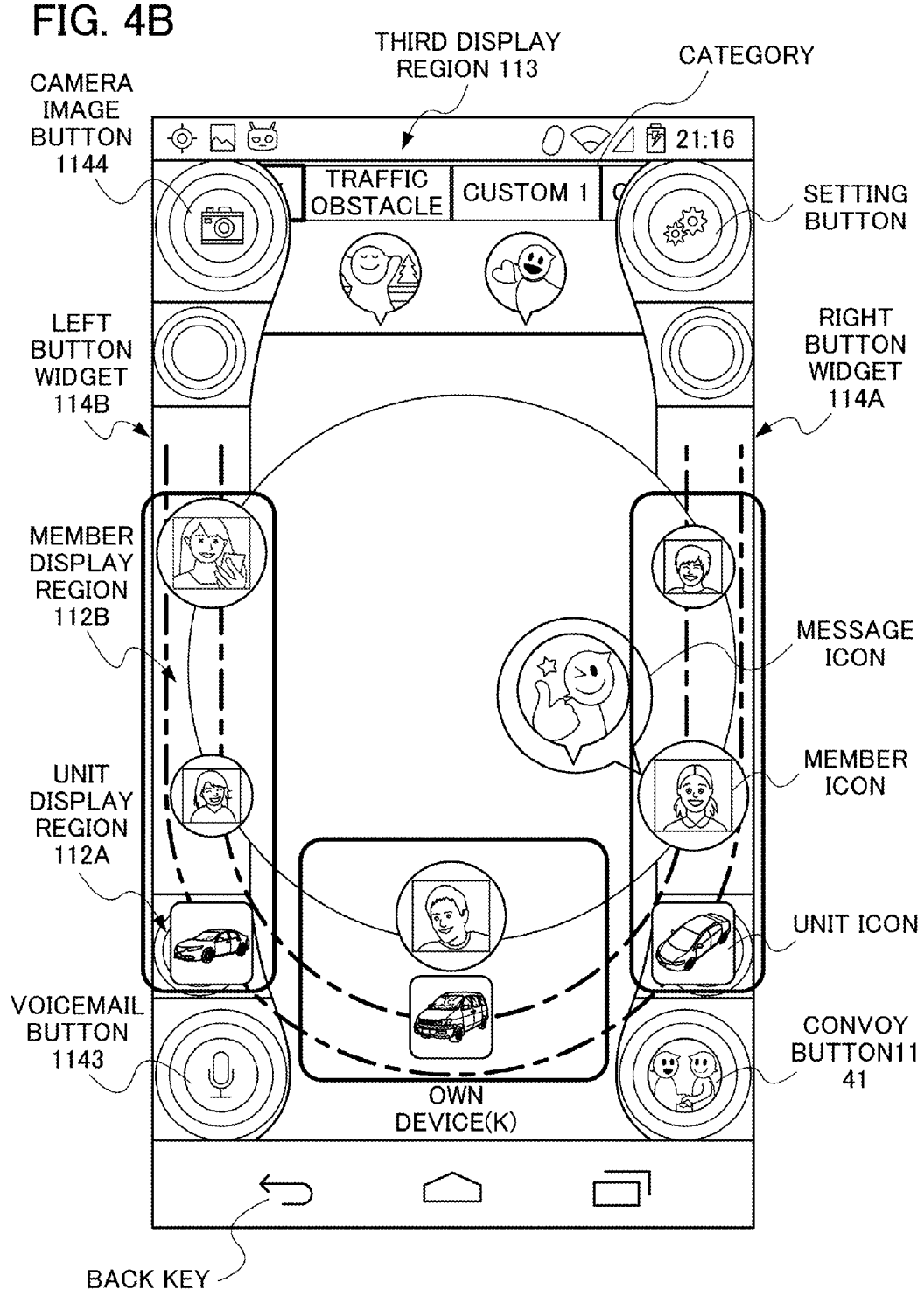
FIG. 4B is a view showing a display example of an arrangement pattern B of the first embodiment.

An arrangement pattern B is shown in FIG. 4B.

As shown in FIG. 4B, the message display region 111 displaying a message icon is provided at the center of the display unit 11. The unit display region 112A displaying unit icons is provided so as to encircle at least three sides of the message display region 111. The unit display region 112A is provided to be associated with the member display region 112B displaying the identification information (member icon) of the user associated with this unit information (unit icon).

As shown in FIG. 4B, in the arrangement pattern B, a region in which the respective unit display regions 112A and respective member display regions 112B displaying the identification information (member icon) of the user associated with this unit information (unit icon) are put together forms a U shape.

By configuring in this way, the member icon displayed in the member display region 112B associated with this unit display region 112A comes to be displayed adjacent to the unit icon that is the attribute information of this member. Then, it is possible to display so that the member icons of the users displayed in the respective member display regions 112B surround the message display region 111.

It is thereby possible for the identification information (e.g., member icon) of users associated with the respective unit information (unit icons) to be distinguished from other unit information, and render a collective feeling.

(Arrangement Locations of Unit Icon and Member Icon)

By way of the first display mode control section 43 described later, it is possible to prepare the member icon arrangement locations by providing predetermined intervals so as to be able to arrange a predetermined number (e.g., M number) of member icons on the member display region 112B.

For example, in the case of the unit being a vehicle, it is possible to prepare member icon arrangement locations in a fixed number that can ride in the vehicle on the member display region 112B associated with this unit icon.

(User Icon of User of Own Device)

In the arrangement pattern B, it is preferable to intuitively distinguish between the user icon corresponding to the own device and user icons corresponding to other mobile devices (unit icon and member icon).

For this reason, in the arrangement pattern B, it is preferable to display the user icon corresponding to the own device (unit icon and member icon), for example, in the unit display region 112A and member display region 112B associated thereto, arranged below the center of the display unit 11.

It should be noted that the location of arranging the user icon corresponding to the own device (unit icon and member icon) is not limited to below the center of the display unit 11. By way of the information setting unit 44 described later, it is possible to set to any location.

(Dynamic Arrangement)

In a case of communication connection with a new mobile device being established via the wireless communication unit 20, and the user icon corresponding to this mobile device being associated with a unit icon already displayed, the first display mode control section 431 can arrange the member icon corresponding to the new mobile device in number order at a free member icon arrangement location on the member display region 112B associated with the already displayed unit icon. By displaying "free" intentionally in this way, it is possible to clearly show that there is no connection. For example, it is intuitively understood that there is a remaining permitted number of connections, and a situation has arisen in which there is a participant that was temporarily connected and then disconnected.

(Member Icon)

Similarly to the arrangement pattern A, the first display mode control section 431 can display a member icon to be small, or make superimposed display or non-display, so that each member icon fits into the member region member 113. Then, in a case of receiving a message from a user, i.e. in a case of the user speaking, the first display mode control section 431 can emphasize that a new message has been sent from this user by displaying this member icon to be large. Subsequently, the first display mode control section 431 can display this user icon to be small, or make to superimpose display or non-display, after a predetermined time elapse.

By configuring in this way, due to the unit icon being displayed, even if making a member icon not speaking to non-display, it is possible to render a collective feeling as a unit group.

Arrangement Pattern C

Figure 4C:
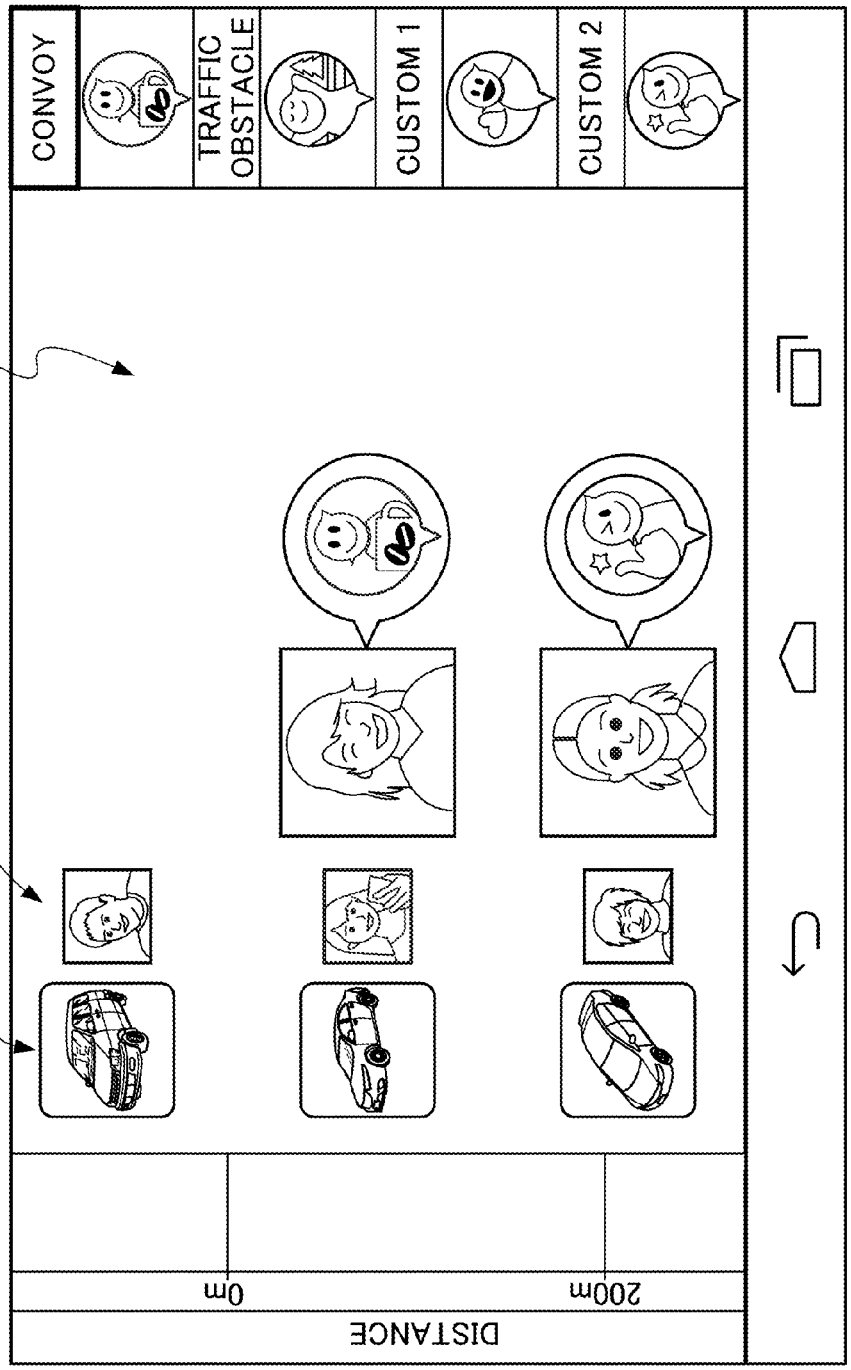
FIG. 4C is a view showing a display example of an arrangement pattern C of the first embodiment.

An arrangement pattern C is shown in FIG. 4C.

As shown in FIG. 4C, the unit display region 112A is provided so as to coincide with a side orientation of the left side of the display unit 11. The member display region 112B is provided at the right side of the unit display region 112A. Furthermore, the unit icon, member icon and message icon are displayed in order from the left by providing the message display region 111 at the right side of the member display region 112B.

By the member icons being arranged and displayed side by side adjacent to the unit icon to which this member belongs, it is possible to render a collective feeling as a unit distinguished from other units. It should be noted that the form of a square tile shape is preferable for the member icons.

The arrangement pattern C shown in FIG. 4C is established as landscape display; however, it is not limited to landscape display. It may be established as portrait display. In addition, although the unit display region 112A is provided so as to coincide with a side orientation of the left side of the display unit 11, it is not limited thereto. It may be established in an arrangement pattern reversing left and right.

(Arrangement Locations of Unit Icon and Member Icon)

In the case of the maximum number of unit icons being set in advance, it is possible to prepare unit information display positions in the amount of a maximum number of unit icons in a side orientation of the left side of the display unit 11.

In the case of the maximum number of member icons associated with the respective unit icons being set in advance, the member display region 112B displaying the member icons associated with the respective unit icons can be prepared in the amount of the maximum number of member icons associated with the respective unit icons.

(User Icon of User of Own Device)

In the arrangement pattern C, it is preferable to intuitively distinguish between the user icon corresponding to the own device and user icons (unit icon and member icon) corresponding to other mobile devices (other senders).

For this reason, in the arrangement pattern C, for example, the unit icon and member icon corresponding to the own device can be displayed in the unit display region 112A positioned at the upper most side of the display unit 11 and the member display region 112B associated thereto, respectively.

It should be noted that the location at which arranging the user icon corresponding to the own device (unit icon and member icon) is not limited to the upper most of the display unit 11. By way of the information setting unit 44 described later, it is possible to set to any location.

(Dynamic Arrangement)

In the case of communication connection with a new mobile device being established via the wireless communication unit 20, and the attribute information (unit information) of the user of this mobile device corresponding to an non-display unit icon, it is possible to arrange attribute information (unit icon) of the user of the new mobile device in a free unit information display position on the unit display region 112A, by way of the first display mode control section 431 described later. At the same time, the member icon of the user of this mobile device can be arranged in a member icon arrangement location of the member display region 112B associated with this unit icon, by way of the first display mode control section 431 described later.

It should be noted that in the case of the attribute information (unit information) of the user of the mobile device newly making a communication connection corresponding to an already displayed unit icon, it is possible to arrange in number order in a free member icon display location on the member display region 112B associated with the already displayed unit information. By displaying "free" intentionally in this way, it is possible to clearly show that there is no connection. For example, it is intuitively understood that there is a remaining permitted number of connections, and a situation has arisen in which there is a participant that was temporarily connected and then disconnected.

For example, in the case of the unit being a vehicle, it is preferable to prepare member icon arrangement locations of the fixed number that can ride in the vehicle on the member display region 112B associated with this unit icon.

(Member Icon)

Similarly to the arrangement pattern A, the first display mode control section 431 can display a member icon to be small, or make superimposed display or non-display, so that each member icon fits into the member display region 112B. Then, in a case of receiving a message from a user, i.e. in a case of the user speaking, the first display mode control section 431 can emphasize that a new message has been sent from this user by displaying this member icon to be large. Subsequently, the first display mode control section 431 can display this user icon to be small, or make to superimpose display or non-display, after a predetermined time elapse.

By configuring in this way, due to the unit icon being displayed, even if making a member icon not speaking to non-display, it is possible to render a collective feeling as a unit group.

Next, the shared matters of all of the arrangement patterns A to C will be explained.

(Association Between Message Icon and Member Icon)

As shown in FIGS. 4A to 4C, for example, it can be configured so that the message icon (speaker) corresponding to the mobile device that is the sending source of the message is displayed in the member display region 112B, and the message icon corresponding to this message is displayed to be associated by way of a balloon in the message display region 111, for example.

By configuring in this way, since the senders (speakers) are organized and displayed based on unit information, in addition to information of "who is the sender (speaker)", it is possible to intuitively understand information like "to which unit does the sender (speaker) belong" (e.g., riding in which car, belonging to which family, belonging to a unit going to which destination).

(List of Selectable Message Icons)

As shown in FIG. 4A, it is possible to display a list of message icons corresponding to selectable stylized (and fixed) phrase messages in a predetermined display region (hereinafter referred to as "third display region 113") provided at a lower part, for example, on the display unit 11. The icon has a button function for selection and sending, and as described later, in the case of sending a stylized (and fixed) phrase message to a mobile device participating in the chat, the user can simply send this stylized (and fixed) phrase message by way of the message processing unit 45 described later, by selecting a message icon corresponding to the message that is trying to be sent, from the list of a plurality of message icons displayed in the third display region 113.

As shown in FIG. 4A, when a button for selecting a category of messages (for example, convoy, traffic obstacle, etc.) is displayed at an upper part within the third display region 113, and a category of messages is selected by tapping, for example, the list of message icons corresponding to messages belonging to this category is displayed at a lower part within the third display region 113. It should be noted that it can be made so that a hidden message icon is displayed by scrolling a lower part within the third display region 113 by way of a left-right swipe operation. When this message icon is selected by clicking or tapping, the processing up until sending processing is performed in the present example.

In addition, as another modified example, it is possible to display by dividing the display of message icons into two stages. In this case, among the two stages, it is possible to make one as a fixed format aligning predetermined message icons, and make the other one a variable format switchable (scrollable) by way of a flip or the like, for example. It is possible to improve the operability by allocating messages having a high frequency of use or messages that can reply to an immediate reply demand to the one stage on the fixed side.

It should be noted that the message icons displayed in the third display region are normally displayed to be small. Therefore, in the case of the third display region being provided at a lower side, for example, on the display unit 11, it is also possible to display a message icon to be enlarged by a flip action from bottom to top.

In addition, by extended pressing of a message icon being displayed in the third display region 113, it is possible to display a registration screen for registering any contents in this icon.

It should be noted that the arrangement of the third display region 113 is not limited to the lower side on the display unit 11. It may be arranged at a predetermined position such as the upper side, for example, on the display unit 11.

In addition, in the case of displaying the display of message icons to be divided into two stages, it is may arranged by separating one stage at the upper side of the display unit 11, for example, and the other stage at the lower side of the display unit 11.

(Button Widget)

As shown in FIG. 4A and FIG. 4B, it is possible to display a widget (hereinafter also referred to as "button widget 114") that includes various operation buttons at a left side, for example, on the display unit 11.

It should be noted that, although the button widget is not illustrated in FIG. 4C, it can be displayed on both sides of the display unit 11.

As shown in FIGS. 4A and 4B, it is possible to configure the button widget 114 so as to consist of a right button widget 114A and a left button widget 114B, where the right button widget 114A and left button widget 114B each can give a shape that greatly assume a region in the central part in the vertical direction, even as the width thereof becomes narrower.

By configuring in this way, it is possible to make so as not to obstruct the display of unit icons and member icons in the unit display region 112A and member display region 112B in a wider range.

It should be noted that the button widget 114 may be configured so as to display at the left side or right side as one button widget 114 including all of the aforementioned operation buttons, without separating into left and right.

(Slide-in/Slide-Out)

Figure 4D:
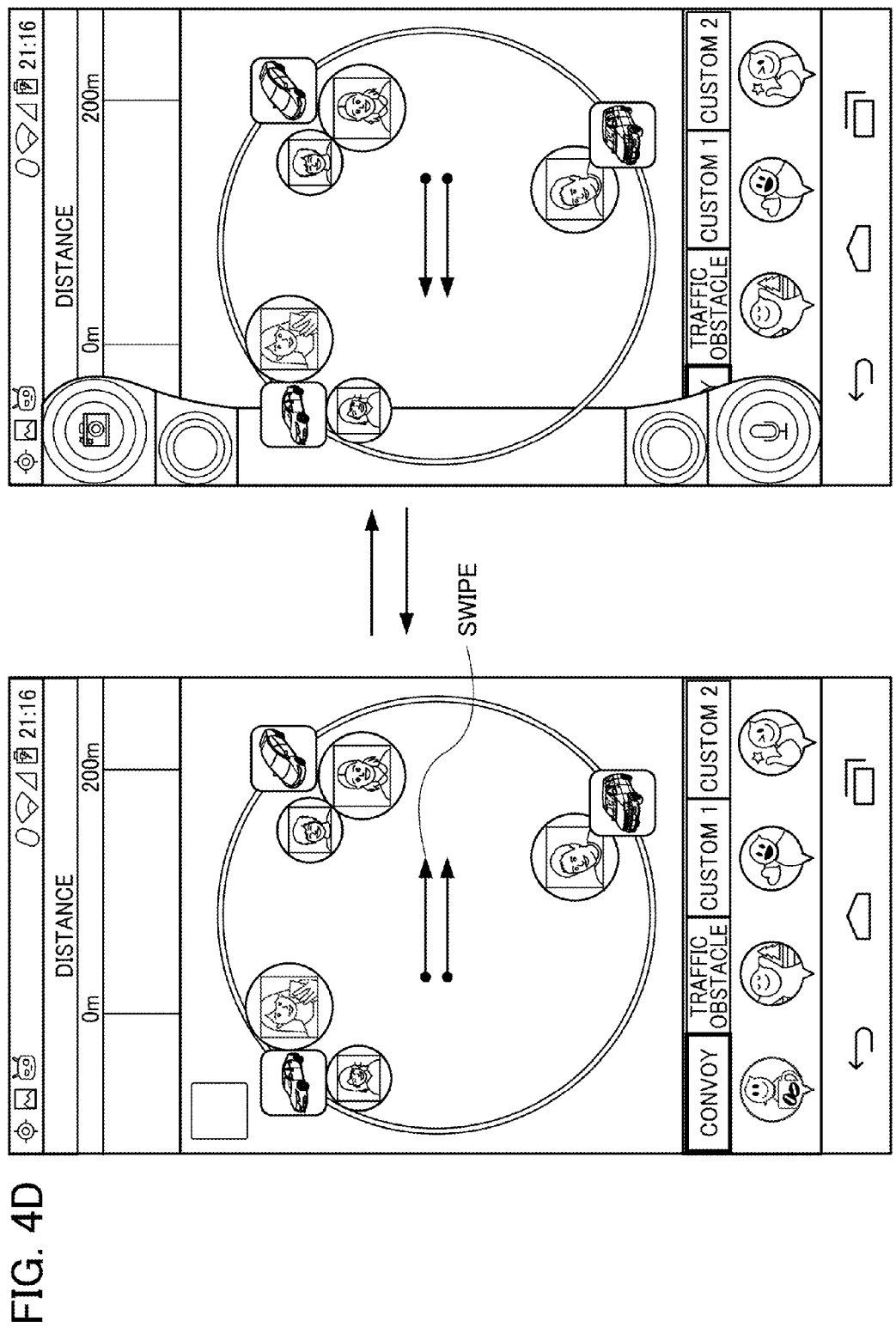
FIG. 4D is a view showing an operation example of making a button widget 114 slide-in/slide-out of a display unit 11 of the electronic device 2 of the first embodiment.

As shown in FIG. 4D, the button widget 114 can be made to slide-in/slide-out on the display unit 11, by way of a swipe operation (operation making a finger slide while the finger contacts the screen) from the left side. More specifically, in a state in which the left button widget 114B is not being displayed on the display unit 11, the button widget 114B is made to slide-in to the left side of the display unit 11 by making a finger contact the display unit 11 and then sliding to the right direction. In addition, in a state in which the left button widget 114B is being displayed on the display unit 11, the left button widget 114B is made to slide-out from the left side of the display unit 11 by making a finger contact the display unit 11 and then sliding to the left direction.

It should be noted that slide-in/slide-out of the left button widget 114B may be activated only in the case of a slide operation by multi-touch, and be inactivated in the case of a slide operation by single-touch.

Excluding the differences between left and right, the slide-in/slide-out operations of the left button widget 114B are similar to the slide-in/slide-out operations of the right button widget 114A.

The right button widget 114A includes a convoy button 1141 and a setting button 1142, and the left button widget 114B includes a voicemail button 1143, a camera image button 1144, etc.

The setting button 1142 is a button for displaying a setting screen to perform settings such as user profile information (user information). By the setting button 1142 being depressed, the setting screen is displayed on the display unit 11, whereby it is possible to appropriately perform the setting of model information of the own car, identification information of the user ("member information") and attribution information of the user ("unit information"), settings such as greeting messages, etc., according to the time, place, conditions, etc. It should be noted that, as mentioned above, upon setting of user profile information (user information), etc., it is possible to use a template established in advanced. In addition, it is also possible for the user to create.

For example, a portrait photo (or sketch) of oneself can be set as the member icon, and a photograph (or picture) of a car can be set as the unit icon.

In addition, it is possible to set in advance the arrangement pattern classifications (A to C) designating in which arrangement pattern to display, among the aforementioned three arrangement patterns A to C on the display unit 11.

Furthermore, in the case of displaying a received message, it is possible to set in advance on the receiving side to display either of the member information or unit information in the relative position display region 115 described later.

Similarly, in the case of sending a connection request or message to another mobile device, it is possible to set in advance either to send only either of the member icon or unit icon as the user icon corresponding to the own device, or to send both.

The voicemail button 1143 is a button for a user to create a voicemail. By depressing or touching the voicemail button 1143, the user can create a voicemail by following the guidance displayed on the display unit 11 (or guided by audio). After voicemail creation, this voicemail thus created is sent to mobile devices participating in the chat (i.e. in a currently communicable state) by way of the message processing unit 45 described later.

The camera image button 1144 is a button for the user to create an image message by way of a built-in camera. By depressing or touching the camera image button 1144, it enters an image-capture mode, whereby an image message can be created. After image message creation, this image message created is sent to mobile devices participating in the chat (i.e. in a currently communicable state) by way of the message processing unit 45 described later.

It should be noted that, although not illustrated, it is possible to include a text button for creating a text message. By depressing or touching the text button 1145, the user can edit text to create a text message. After text message creation, the text message created is sent to mobile devices participating in the chat (i.e. in a currently communicable state) by way of the message processing unit 45 described later.

(Relative Position Display Region)

For example, as shown in FIG. 4A, the display region for displaying the relative position of the user (mobile device) participating in the chat (i.e. in a currently communicable state) relative to the own device (hereinafter also referred to as "relative position display region 115") can be displayed at an upper part, for example, on the display unit 11.

It should be noted that, although the relative position display region is not illustrated in FIGS. 4B and 4C, it is possible to provide the relative position display region as appropriate.

Figure 5A:
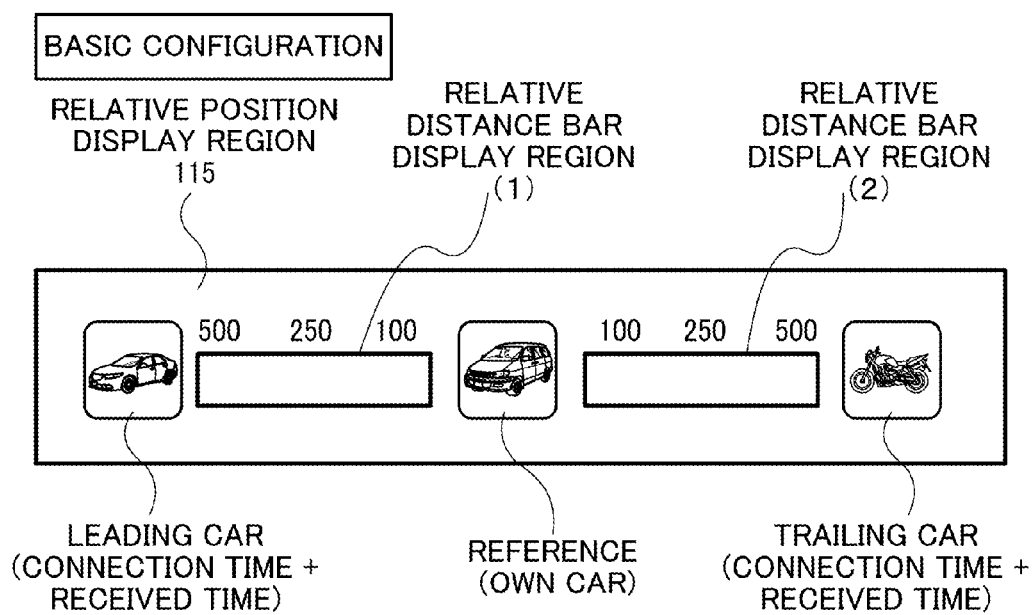
FIG. 5A is a view showing a display example of a relative position display region 115 displayed on the display unit 11 of the electronic device 2 of the first embodiment.

As shown in FIG. 5A, the display region for displaying the relative position of a mobile device participating in the chat (i.e. in a currently communicable state) relative to the own device (hereinafter also referred to as "relative position display region 115") is displayed at an upper part, for example, on the display unit 11.

The relative position display region 115, for example, is displayed in a bar form extending in the left-right direction of the display unit 11, and in the relative position display region 115, for example, it is possible to: arrange the user icon corresponding to the own device at the center in the left-right direction; assign the left side from the user icon corresponding to the own device as ahead in the traveling direction and the right side as behind in the traveling direction; arrange a user icon corresponding to a mobile device positioned ahead relative to the own device at the left side; and arrange a user icon corresponding to a mobile device positioned behind relative to the own device at the right side. By arranging icons with one side of the display region 115 relative to the own device as forward and the other side as rearward, it is possible to intuitively understand the relative position of a mobile device relative to the own device.

It should be noted that, the user icon corresponding to the other mobile device can be displayed in the relative position display region 115 during connection with the own device, or in the case of receiving communication information from the other mobile device, as described later. For the user icon corresponding to the own device, it is possible to display in the relative position display region 115 appropriately after startup.

It should be noted that the arrangement location of the relative position display region 115 is not limited to the upper part on the display unit 11, and may be arranged at any position such as a lower part on the display unit 11, for example.

In addition, on the receiving side, it is possible to set in advance to display either the member icon or unit icon as the user icon corresponding to the other mobile device in the relative position display region 115.

On the receiving side, it can be set via the setting screen displayed which of the member information or unit information to display by the setting button 1142 being depressed.

It can also be configured so that the unit icon is displayed as a default setting. It should be noted that the member icon is displayed in the case of the unit icon not being sent.

For example, FIG. 4A, etc. illustrate examples of displaying the member icons as the user icons corresponding to the other mobile devices in the relative position display region 115. On the other hand, FIGS. 5A to 5I illustrate examples of displaying unit icons in the relative position display region 115. By configuring in this way, it is possible to display unit icons (e.g., a car)

A relative position calculation unit 41 described later, in a case of receiving a connection request, connection confirmation response, or communication information, received response, etc. from a mobile device participating in the chat, based on GPS information including the longitude and latitude included in the connection request, connection confirmation response, or communication information, received response, etc. and the GPS information of the own device, etc., GPS information of the own device, etc. included in a received response, etc., can calculate the relative position of this mobile device relative to the own device, for example, the relative distance between this mobile device and the own device, forward-rearward position of this mobile device relative to the own device, movement direction of this mobile device relative to the traveling direction of the own device (for example, same traffic lane ahead, same traffic lane behind, opposite traffic lane ahead, opposite traffic lane behind, ahead to the right, ahead to the left, behind to the right, behind to the left, etc.), etc.

Next, how the relative position is displayed will be explained by referencing FIGS. 5A to 5I. It should be noted that a case of setting so as to configure so that the unit icon is displayed in the relative position display region 115 is exemplified. For the case of setting so as to display the member icon in the relative position display region 115, the face of a person is displayed in place of a picture of a car.

(Relative Distance Bar)

For example, as shown in FIG. 5A, during connection with another mobile device or during communication information receipt from the other mobile device, it is possible to display the user icon corresponding to this mobile device, and to display the relative position between this mobile device and the own device by way of a bar proportional to distance in a relative distance bar display region 1 and relative distance bar display region 2 provided in the relative position display region 115. Herein, the relative distance bar display region 1 and the relative distance bar display region 2 respectively represent the relative distance from the other mobile device on board a leading car, and the relative distance from the other mobile device on board a trailing car. By configuring in this way, it is possible to display the relative distance between the other mobile device and the own device and the forward-rearward relationship intuitively.

(Ahead/Behind Relationship)

Figure 5B:
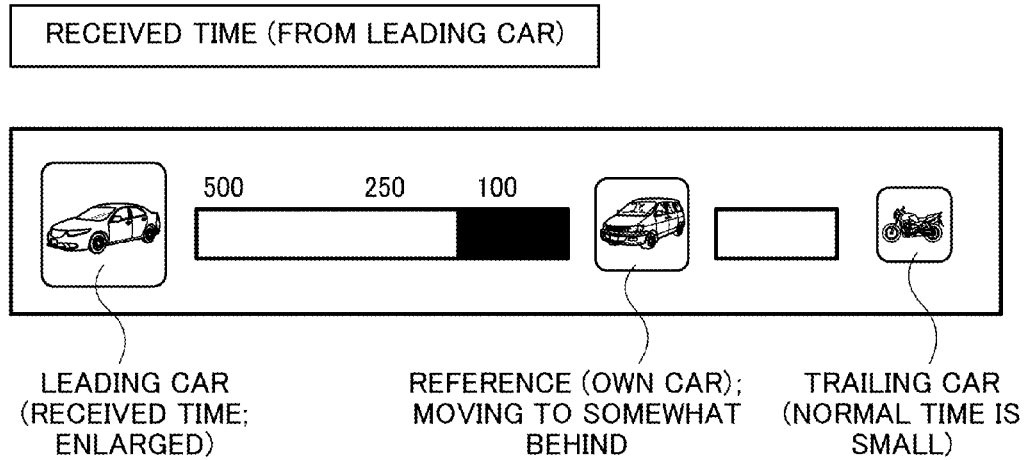
FIG. 5B is a view showing a display example of a leading vehicle displayed in the relative position display region 115 of the first embodiment.
Figure 5C:
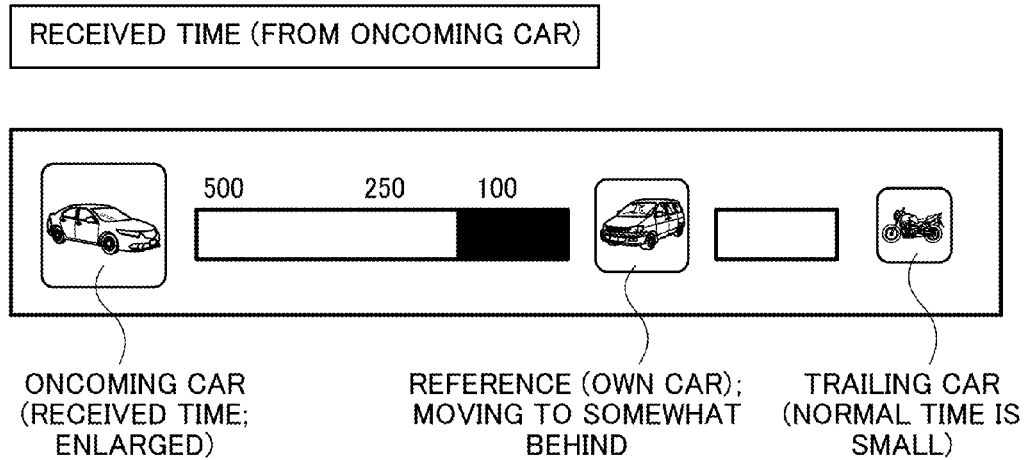
FIG. 5C is a view showing a display example of an oncoming vehicle displayed in the relative position display region 115 of the first embodiment.
Figure 5D:
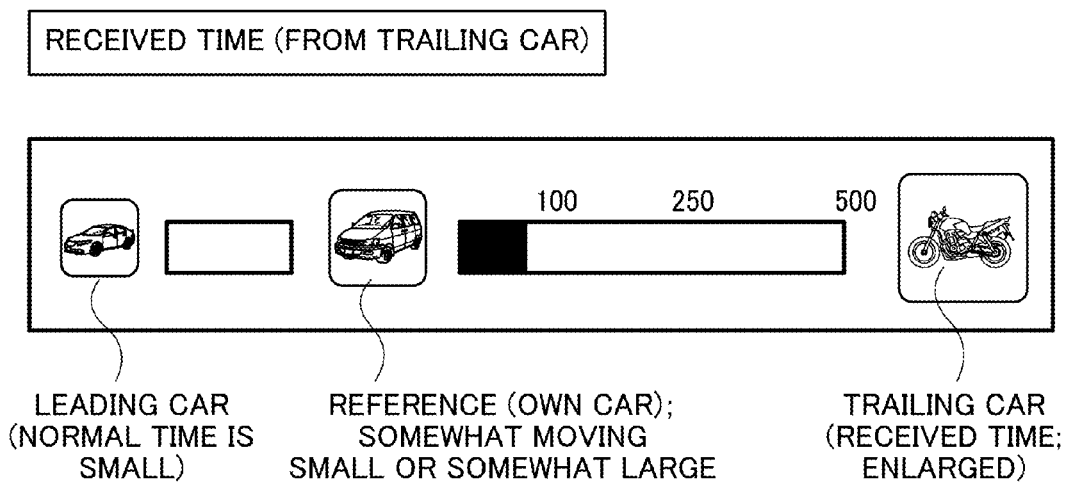
FIG. 5D is a view showing a display example of a trailing vehicle displayed in the relative position display region 115 of the first embodiment.

Examples of displaying, during connection with another mobile device on board a leading car or oncoming car, during communication information receipt, or the like, the relative distance between this other mobile device and the own device and the relative ahead/behind positional relationship by way of the relative position display region 115 are shown in FIGS. 5B to 5D.

As shown in FIG. 5B, during connection with the other mobile device on board the leading car, during communication information receipt, or the like, in a case of displaying the relative distance from this other mobile device, it is possible to display the relative distance bar display region 1 to be slightly larger by dynamically moving the user icon corresponding to the own device from the center in the left-right direction of the display unit 11 to the right direction, while not displaying or shortening the relative distance bar display region 2.

Upon doing so, for the traveling direction of this other mobile device, in order to show the same movement direction as the own device, an arrow pointing to the left side can be simultaneously displayed. It should be noted that, in the case of the user icon being established as a picture of a lateral face of a vehicle, etc. from which the traveling direction is understood, for example, the orientation of the user icon corresponding to this other mobile device can be displayed so as to face the same direction as the own device.

Similarly, as shown in FIG. 5C, during connection with another mobile device on board an oncoming car, during communication information receipt, or the like, in the case of displaying the relative distance from this other mobile device, it is possible to display the relative distance bar display region 1 to be slightly larger by dynamically moving the user icon corresponding to the own device from the center in the left-right direction of the display unit 11 to the right direction, while not displaying or shortening the relative distance bar display region 2.

Upon doing so, for the traveling direction of this other mobile device, in order to show as facing the opposite direction as the own direction, an arrow pointing to the right side can be simultaneously displayed. It should be noted that, in the case of the user icon being established as a picture of a lateral face of a vehicle, etc. from which the traveling direction is understood, for example, the orientation of the user icon corresponding to this other mobile device can be displayed so as to face the opposite direction as the own device.

Conversely, as shown in FIG. 5D, during connection with another mobile device on board a trailing car, during communication information receipt, or the like, in the case of displaying the relative distance from this other mobile device, it is possible to display the relative distance bar display region 2 to be slightly larger by dynamically moving the user icon corresponding to the own device from the center in the left-right direction of the display unit 11 to the left direction, while not displaying or shortening the relative distance bar display region 1.

Upon doing so, for the traveling direction of this other mobile device, in order to show the same traveling direction as the own direction, an arrow pointing to the left side can be simultaneously displayed. It should be noted that, in the case of the user icon being established as a picture of a lateral face of a vehicle, etc. from which the traveling direction is understood, for example, the orientation of the user icon corresponding to this other mobile device can be displayed so as to face the same direction as the own device.

Communication Information Reception Time, etc.

It should be noted that, although not illustrated, during connection with another mobile device on board an oncoming car having passed beside the own device to behind on the opposing lane, during communication information receipt, or the like, in the case of displaying the relative distance from this other mobile device, it is possible to display the relative distance bar display region 2 to be slightly larger by dynamically moving the user icon corresponding to the own device from the center to forwards, while not displaying or shortening the relative distance bar display region 1.

Upon doing so, for the traveling direction of this other mobile device, in order to show as facing the opposite direction as the own direction, an arrow pointing to the right side can be simultaneously displayed. It should be noted that, in the case of the user icon being established as the vehicle, etc. from which the traveling direction is understood, for example, the orientation of the user icon corresponding to this other mobile device can be displayed so as to face the opposite direction as the own device.

It should be noted that it may be displayed to distinguish being in the same lane or being in the oncoming lane by setting the color of the user icon corresponding to the other mobile device for the case of the other mobile device being in the same lane as the own device, and the color of the user icon corresponding to the other mobile device in the case of the other mobile device being in the opposing lane to the own device as different colors.

(Intersection Left/Right)

Figure 5E:
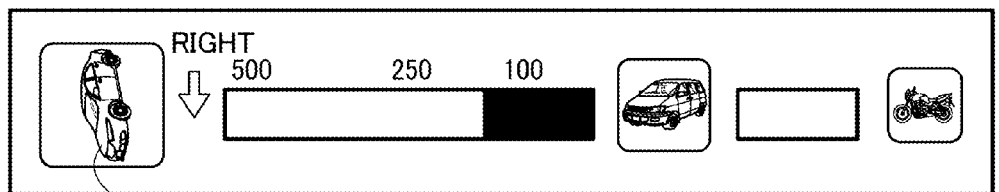
FIG. 5E is a view showing a display example of a front-right vehicle displayed in the relative position display region 115 of the first embodiment.
Figure 5F:
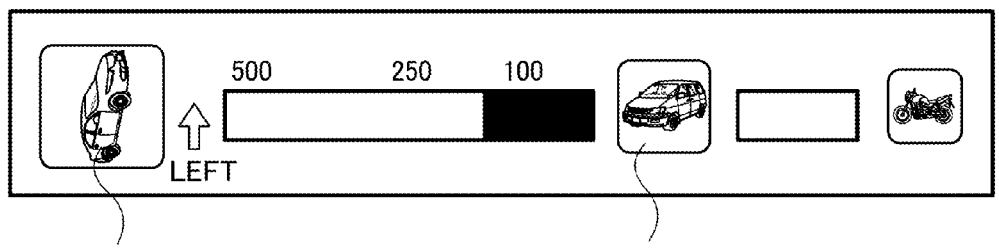
FIG. 5F is a view showing a display example of a front-left vehicle displayed in the relative position display region 115 of the first embodiment.

For intersecting roads, etc., examples of displaying, during connection with another mobile device on board a forward car on either the left or right, during communication information receipt, or the like, the relative distance between this other mobile device and the own device and the relative left/right positional relationship by way of the relative position display region 115 are shown in FIGS. 5E and 5F.

As shown in FIG. 5E, during connection with the other mobile device on board a front-right car, during communication information receipt, or the like, in the case of displaying the relative distance from this other mobile device, it is possible to display the relative distance bar display region 1 to be slightly larger by dynamically moving the user icon corresponding to the own device from the center in the left-right direction of the display unit 11 to the right direction, while not displaying or shortening the relative distance bar display region 2.

Upon doing so, for the traveling direction of this other mobile device, in order to show as positioned to the front-right direction from the own device, an arrow pointing to a lower side can be simultaneously displayed. It should be noted that, in the case of the user icon being established as the vehicle, for example, the orientation of the user icon corresponding to this other mobile device can be displayed so as to face to the lower side.

Similarly, as shown in FIG. 5F, during connection with the other mobile device on board a front-left car, during communication information receipt, or the like, in the case of displaying the relative distance from this other mobile device, it is possible to display the relative distance bar display region 1 to be slightly larger by dynamically moving the user icon corresponding to the own device from the center in the left-right direction of the display unit 11 to the right direction, while not displaying or shortening the relative distance bar display region 2.

Upon doing so, for the traveling direction of this other mobile device, in order to show as positioned to the front-left direction from the own device, an arrow pointing to an upper side in the drawing can be simultaneously displayed. It should be noted that, in the case of the user icon being established as a lateral face of a vehicle, etc. from which the traveling direction is understood, for example, the orientation of the user icon corresponding to this other mobile device can be displayed so as to face to the upper side in the drawing.

It should be noted that, although not illustrated, during connection with the other mobile device on board a right-rear car or left-rear car, during communication information receipt, or the like, in the case of displaying the relative distance from this other mobile device, it is possible to display the relative distance bar display region 2 to be slightly larger by dynamically moving the user icon corresponding to the own device from the center in the left-right direction of the display unit 11 to the left direction, while not displaying or shortening the relative distance bar display region 1. Upon doing so, for the traveling direction of this other mobile device, in order to show as positioned to the right-rear direction from the own device, an arrow pointing to a lower side in the drawing can be simultaneously displayed. In addition, it is possible to display the orientation of the user icon corresponding to this other mobile device so as to face the lower side in the drawing. It should be noted that, in the case of the user icon being established as a picture of a lateral face of a vehicle, etc. from which the traveling direction is understood, for example, if positioned at the left and rearwards, the orientations of the arrow and the user icon can be displayed so as to face to the upper side in the drawing.

It should be noted that it may be displayed to distinguish being positioned at the front right or being positioned at the front left by setting the color of the user icon corresponding to this mobile device for the case of the other mobile device being positioned to the front right from the own device, and the color of the user icon corresponding to this mobile device in the case of the other mobile device being to the front left of the own device as different colors.

It may be displayed to distinguish being positioned at the front right or being positioned at the front left by setting the color of the user icon corresponding to this mobile device as different colors for the case of the other device being positioned at the rear right from the own device and being positioned at the rear left.

(Enlarged Display During Connection or During Receipt)

During connection with another mobile device, during communication information receipt from the other mobile device, or the like, it is possible to emphasize the user icon corresponding to this other mobile device displayed in the relative position display region 115 for a predetermined time immediately after message receipt described later, by way of enlarged display, etc.

(Overwrite Display)

As mentioned above, during connection with another mobile device, during communication information receipt from the other mobile device, or the like, the relative position information of this other mobile device is displayed in the relative position display region 115. Therefore, during connection with a new mobile device, during communication information receipt from a different mobile device, or the like, the relative position information of this new mobile device or the different mobile device is preferentially displayed in place of the relative position information most recently displayed. It should be noted that, for a mobile device that is in a currently communicable state, it is possible to display the user icon corresponding to this mobile device in the relative position display region 115. For example, it is possible to arrange the user icon corresponding to the own device in the center in the left-right direction of the relative position display region 115, arrange the user icon corresponding to a mobile device positioned ahead relative to the own device at the left side of the relative position display region 115, and arrange the user icon corresponding to a mobile device positioned behind relative to the own device at the right side of the relative position display region 115. In this case, the user icon displayed can be reduced or enlarged. By configuring in this way, it is possible to display a plurality of user icons. It should be noted that, in the case of the number of displayable user icons being limited, upon the display of user icons, it is preferable to prioritize the most recently connected mobile device or the mobile device from which communication information was recently received.

(Two-Lane Display)

Figure 5G:
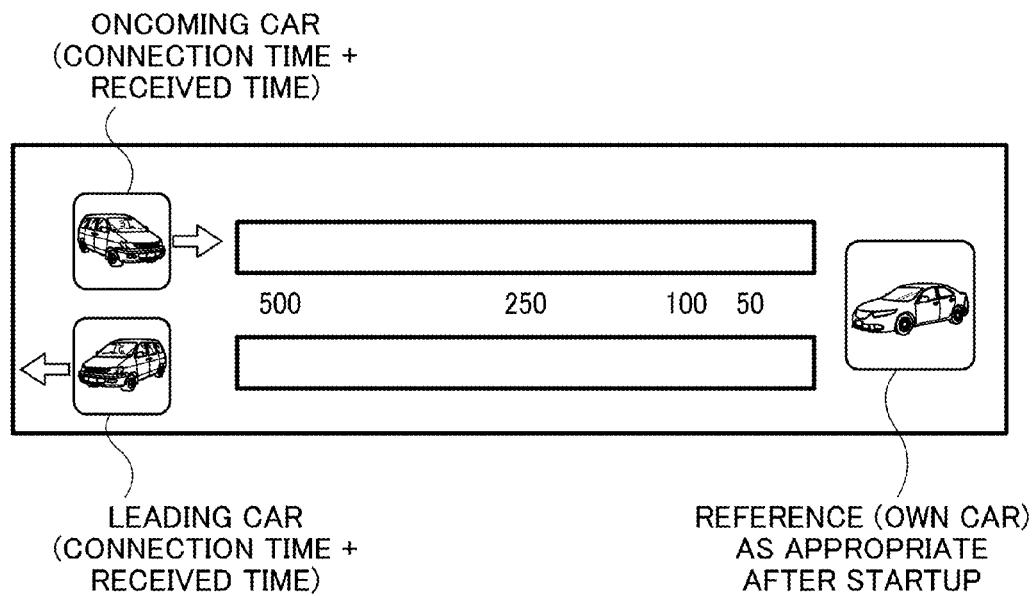
FIG. 5G is a view showing a display example of two traffic lanes in the relative position display region 115 of the first embodiment.
Figure 5H:
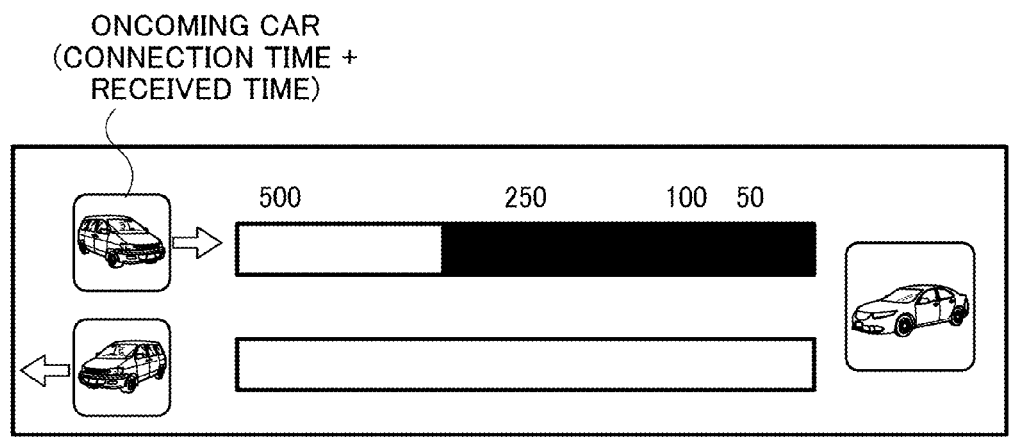
FIG. 5H is a view showing a display example of an oncoming vehicle in the opposite lane of two traffic lanes in the relative position display region 115 of the first embodiment.

As a modified example, for example, as shown in FIG. 5G, it is possible to provide a relative distance bar display region corresponding to each of the same lane and opposite lane as the own device, in the relative position display region 115. By configuring in this way, it is possible to intuitively display being travelling on the same lane as the own device, i.e. same direction, or being travelling on the opposite lane to the own device, i.e. opposite direction. In the case of two-lane display, for example, as shown in FIG. 5H, in regards to the way of display of the distance bar in the relative distance bar display region corresponding to the same lane as the own device and the way of display of the user icon corresponding to the other mobile device positioned in the same lane, as well as the way of display of the distance bar in the relative distance bar display region 115 corresponding to the opposite lane to the own device and the way of display of the user icon corresponding to the other mobile device positioned in the opposite lane, they are basically the same as the way of display in the case of providing the relative distance bar display region related to one lane in the aforementioned relative position display region 115, and thus explanations thereof will be omitted.

(List of Relative Position Information)

The relative position information of the most recently connected mobile device or of the mobile device from which communication information was transmitted most recently is normally displayed preferentially in the relative position display region 115.

Figure 5I:
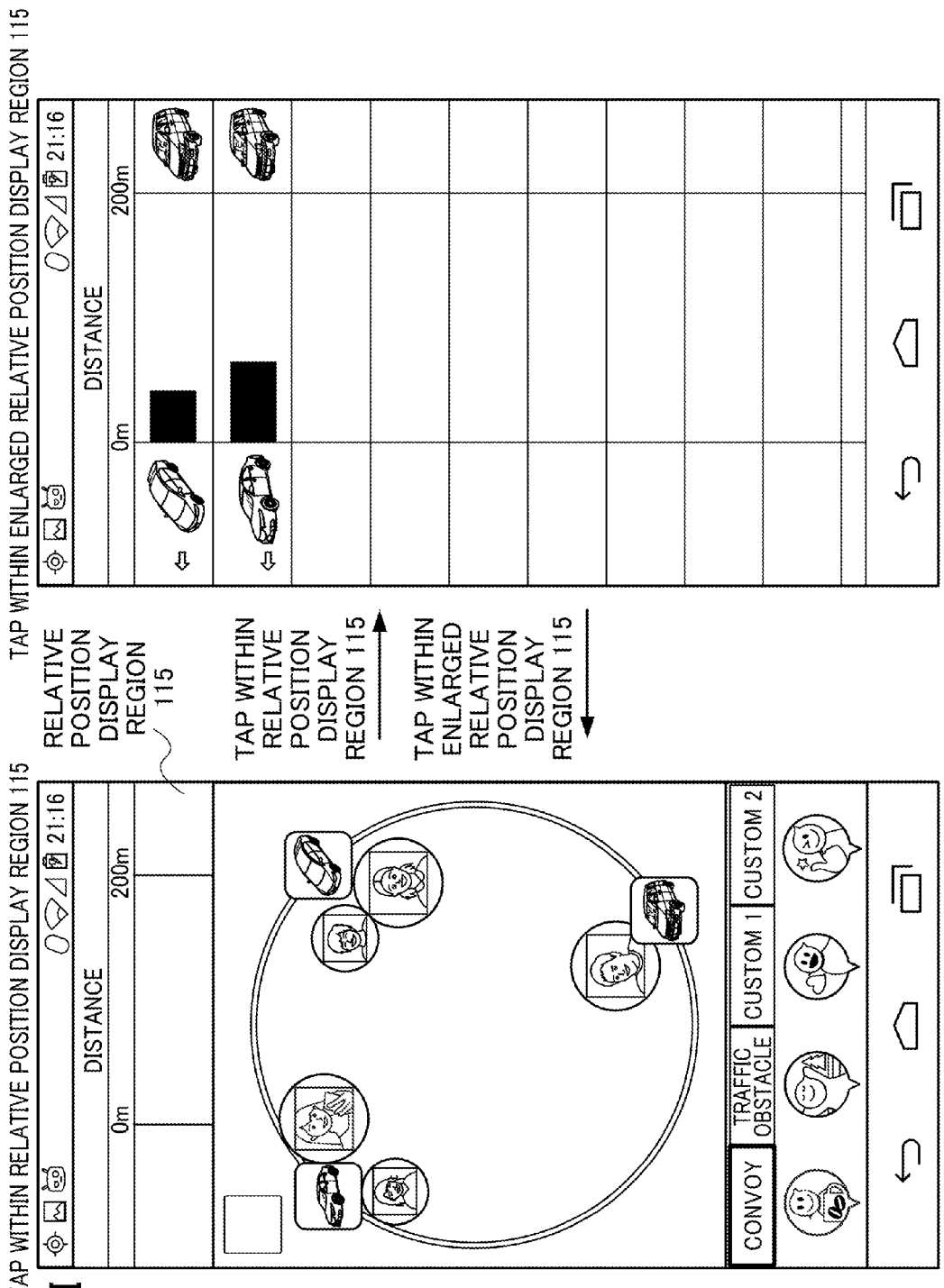
FIG. 5I is a view showing a display example of moving to a plural mobile device list display screen, by tapping the relative position display region 115 displayed on the display unit 11 of the electronic device 2 of the first embodiment.

In order to display positional information of all of the mobile devices, as shown in FIG. 5I, it is possible to configure so that the positional information of all of the mobile devices participating in the chat (i.e. in a currently communicable state) display as a list, by tapping a region within the relative position display region 115, for example.

By configuring in this way, the relative position information of each of the plurality of mobile devices is displayed with the relative position display region 115 expanded longitudinally. It should be noted that, when the relative position information of all of the mobile devices do not fit longitudinally, it can be configured so that positional information of hidden mobile devices is displayed by scrolling by way of swiping vertically, for example.

It should be noted that, in the case of the positional information of all of the mobile devices being displayed as a list, it is possible to return to a simple information display in which the relative position information of the most recently connected mobile device or the mobile device from which communication information was transmitted most recently is displayed, by way of tapping a region within the screen on which the positional information of all of the mobile devices is being displayed as a list on the display unit 11.

In the above way, by displaying the relative positional relationship of the other mobile device participating in the chat relative to the own device in the relative position display region 15, it is possible to understand the relative position of the other mobile device, and thus it is possible to aid in message understanding and support driving information.

(Portrait Display and Landscape Display)

Although various display regions of the display unit 11 have been explained above by exemplifying portrait display, it is not limited to portrait display. It may be made landscape instead of portrait. In addition, according to an acceleration sensor, for example, it may be configured so as to perform portrait/landscape automatic changing to switch between length/width display automatically by tilting the electronic device.

(Touch Panel)

A touch panel is laminated on the display of the display unit 11, and can accept the operations of the user. Among the operations accepted by the touch panel in the present embodiment, selection operations to select any position on the display unit 11 (so-called tap) and slide operations to move a finger after selecting any position on the display unit 11 (so-called swipe and flick) are included. In addition, the touch panel is configured by a multi-touch panel capable of sensing multiple contact points simultaneously. An operation accepted via the touch panel is sent to and processed in the control unit 40.

A speaker 12 performs audio output to the user, and a microphone 13 collects sounds, etc. produced by the user.

The operation unit 14 can be configured by operation buttons, a touch panel-type input device, or the like, whereby various selections and instructions are inputted by the user. It should be noted that the touch panel provided on the display screen of the display unit 11 also functions as the operation unit 14.

In addition, by way of voice recognition technology, it is also possible to input various selections and instructions by the user inputted as sound via the microphone 13.

Storage Unit 32

A storage unit 32 is configured to include ROM, RAM, etc., a control program, etc. for controlling the electronic device 2 is stored therein, as well as storing readable data set by the user via the operation unit 14, and providing a work area to the control unit 40.

Figure 2:
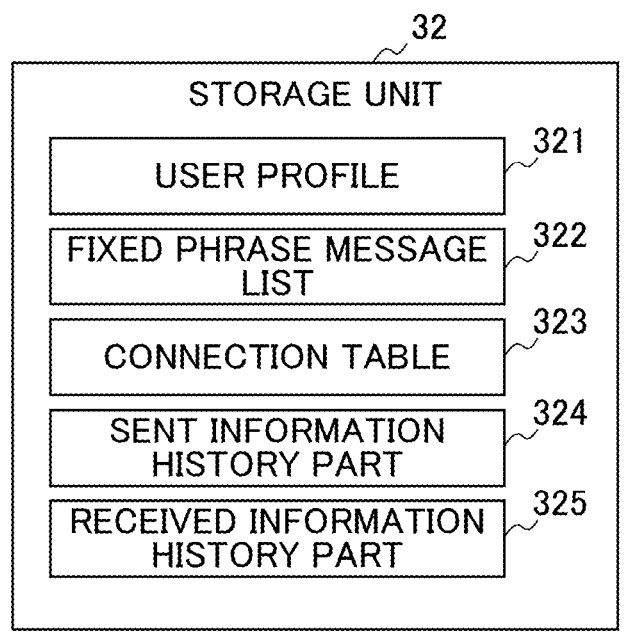
FIG. 2 is a block diagram showing the data organization stored by a storage unit 32 of the first embodiment.

As shown in FIG. 2, the storage unit 32 stores a user profile (user information list) 321, a stylized (and fix) phrase message list 322, connection table 323, sent information history part 324, and a received information history part 325.

The user profile (user information list) 321 stores a plurality of records configured from user information (identification information of the user and attribute information of the user), etc.

It should be noted that the user profile (user information list) 321 can be setting registered using a setting screen displayed by depressing a preset button 1142.

The stylized (and fixed) phrase message list 322 stores a plurality of records consisting of the identification ID of the stylized (and fixed) phrase messages, stylized (and fixed) phrase messages, the identification ID of a message icon associated with this stylized (and fixed) phrase message, message icons, etc.

The stylized (and fixed) phrase message list 322 may be installed in advance. In addition, it may be downloaded as appropriate from a predetermined server, cloud, etc. By configuring in this way, a stylized (and fixed) phrase message and the message icon corresponding to the stylized (and fixed) phrase message are commonly stored in all of the electronic devices 2.

The connection table 323 stores a plurality of records configured from communication address information (for example, IP address, MAC address, etc.) of the own device and other mobile devices that are communicable with the own device, which is generated and updated by the connection processing unit 42 described later, transmitted user information (identification information of the user and/or attribute information of the user) corresponding to this mobile device (user), time information, positional information, etc.

The sent information history part 324 stores a history of communication information sent by the own vehicle 1.

The received information history part 325 stores a history of communication information received from other mobile devices, etc.

By configuring in this way, the user can reference the received communication information according to the received date and time order, sending source order, etc. In addition, the user can text search the data included in communication information.

Also for sent communication information, it is similarly possible to reference according to the sent date and time order, sending source order, etc., and text search the data included in the communication information.

By configuring in this way, a search inquiry of an interchange of communication information among peers becomes possible.

By providing a map information database in the storage unit 32, it is possible to store two-dimensional map information, three-dimensional map information, and map information such as road shape data, facility data and shop data. In addition, it may be downloaded as appropriate from a predetermined server, cloud or the like.

Control Unit

The control unit 40 includes a CPU (Central Processing Unit), etc., and performs overall control of the electronic device 2. As shown in FIG. 1, the control unit 40 includes the relative position calculation unit 41, connection processing unit 42, display control unit 43, information setting unit 44 and message processing unit 45. In addition, the display control unit 43 includes a first display mode control section 431.

Relative Position Calculation Unit

In the case of having received a connection request from the other mobile device via the information receiving unit 21, a connection confirmation response, communication information or the like, the relative position calculation unit 41 calculates the current position of the other mobile device based on GPS information included in the connection request, connection confirmation response, communication information or the like, and map information of a road currently traveled. In addition, the relative position calculation unit 41 calculates the distance between the other mobile device and the own device, relative position direction of the other mobile device from the own device (for example, same traffic lane ahead, same traffic lane behind, opposite traffic lane ahead, opposite traffic lane behind, ahead to the right, ahead to the left, behind to the right, behind to the left, etc.), etc.

Connection Processing Unit

The connection processing unit 42 stores communication address information such as of other mobile device that are communicable with the own device (for example, IP address, MAC address, etc.), user information (identification information of user and/or attribute information of user) corresponding to this mobile device (user), time information, positional information, etc. in a connection table 323.

More specifically, the connection processing unit 42 sends a connection request including communication address information (for example, IP address, MAC address, etc.) for identifying the own device, user information (identification information of user and/or attribute information of user) corresponding to the own device (user), time information, positional information, etc. via the information sending unit 22. Then, based on a connection confirmation from the other mobile device, etc. replying to this connection request, a record including the communication address information of the other mobile device, etc., user information (identification information of user and/or attribute information of user) corresponding to this mobile device, etc., time information, positional information, etc. is created in the connection table 323.

When receiving a connection request, message, received response, etc. from the other mobile device, etc., the connection processing unit 42 stores a record including the communication address information of the other mobile device, etc., user information (identification information of user and/or attribute information of user) corresponding to this mobile device, time information, positional information, etc. in the connection table 323.

Then, the connection processing unit 42 sends, to the other mobile device, etc. having received the connection request, etc., a connection confirmation response, etc. including the address information of the own device, user information (identification information of user and/or attribute information of user) corresponding to the own device, time information, positional information, etc. via the information sending unit 22.

The connection processing unit 42 updates connection information with other mobile devices, etc. created in the connection table 323 as appropriate, based on the connection confirmation, etc. with the other mobile devices, etc. By configuring in this way, it is possible to maintain the connection information related to currently communicable other mobile devices, etc. (communication address information, user information (identification information of user and/or attribute information of user) corresponding to this mobile device, time information, positional information, etc.) in the latest state.

Display Control Unit

The display control unit 43 includes the first display mode control section 431.

The first display control unit 431 can perform display control according to a set arrangement pattern, based on the arrangement pattern classifications (A to C) set in advance.

For this reason, the first display control unit 431 may be configured to include arrangement pattern control section A to arrangement pattern control section C for display control in every arrangement pattern. By configuring in this way, it is possible to perform display control according to the arrangement pattern control section A to arrangement pattern control section C corresponding to the arrangement pattern A to arrangement pattern C set in advance.

(Full-Screen Display)

Based on connection information with the other mobile device, etc. stored in the connection table 323 created by the connection processing unit 42, for example, the first display mode control section 431 displays the member icon corresponding to this other mobile device user on the member display region 112B associated with the unit display region 112A in which the attribute information (unit information) of the user using this mobile device (hereinafter also referred to as "mobile device user") is displayed on the display unit 11, as shown in FIGS. 4A to 4C, for example.

Upon doing so, as shown in FIGS. 4A to 4C, in order to distinguish between the unit icon/member icon corresponding to the own device and a unit icon/member icon corresponding to other mobile devices, etc., the first display mode control section 431, for example, may be configured so as to arrange the unit display region 112A in which the attribute information (unit information) of the user using the own device (hereinafter also referred to as "own device user") is displayed and the display region 112B displaying the identification information (member information) of the own device user associated with this unit display region 112A at the bottom edge (case of FIGS. 4A and 4B), for example, of the display unit 11, or the top edge (case of FIG. 4C) of the display unit 11, respectively.

The first display mode control section 431, as mentioned above, displays the identification information (member icon) of each mobile device user participating in the chat (i.e. in a currently communicable state) by arranging on the member display region 112B associated with the unit display region 112A in which the attribute information (unit icon) of this mobile device user is displayed.

(Display of New Chat Participants)

In response to a communication connection with a new mobile device being established via the wireless communication unit 20 by way of the communication processing unit 42, the first display mode control section 431 dynamically rearranges and displays the user icons of these mobile device users.

More specifically, the user icons of these mobile device users are displayed by arranging on the member display region 112B associated with the unit display region 112A in which the attribute information (unit icon) of this mobile device user is displayed.

In addition, in the case of the attribute information (unit icon) of this mobile device user not being displayed in the unit display region 112A, a new unit display region 112A is created by dynamically rearranging all of the unit display regions 112A in order to additionally display the attribute information (unit icon) of the new mobile device user, and the attribute information (unit icon) of the new mobile device user is displayed therein.

Then, a new member display region 112A is created by dynamically rearranging all of the member display regions 112B including the member display region 112B associated with the unit display region 112A in which the attribute information (unit icon) of this new mobile device user is displayed, and the identification information (member icon) of the new mobile device is displayed therein.

It should be noted that, as mentioned earlier, in the case of being the arrangement pattern A and arrangement pattern C and the maximum number of unit information being set in advance, it is possible to prepare unit information display positions in the amount of the maximum number of unit information at a side orientation of the left side of the display unit 11. In addition, in the case of the maximum number of member information associated with the respective unit information being set in advance, the member display region 112B displaying the member information associated with the respective unit information can be prepared in the amount of the maximum number of member information associated with the respective unit information.

By configuring in this way, in the case of a communication connection with a new mobile device being established via the wireless communication unit 20, the first display mode control section 431 can handle it in the following way.

For example, in the case of the attribute information (unit icon) of this mobile device user not being displayed in the unit display region 112A, it may be configured so as to additionally arrange attribute information (unit icon) of the new mobile device user in a free unit icon arrangement location, in order to display the attribute information (unit icon) of the new mobile device user.

Similarly, in order to display the identification information (member icon) of this new mobile device user, it may be configured so as to additionally arrange the identification information (member icon) of the new mobile device user in a free member icon arrangement location.

(Display of Relative Position)

In response to a communication connection with a new mobile device being established, the first display mode control section 431 calculates relative position information of the new mobile device relative to the own device produced by calculating by the relative position calculation unit 41, and displays the relative position information of the new mobile device having made a communication connection in the relative position display region 115.

By configuring in this way, since the relative position information of the sender can be understood together with the message, imagining the relationship with sender and situation of the sender is facilitated for the receiver, and it is possible to aid in understanding of messages.

It should be noted that it may be configured so as to provide a filtering function that can preset the allowance of receipt from another mobile device, and the allowance of message display from the other mobile device, according to the information setting unit 44 described later. For this filtering function, it may be configured to be performed as member units or unit units.

In the above-mentioned example, assuming there is a setting of the new mobile device (user) being unreceivable, or message undisplayable, the new mobile device user will not be displayed in the user display region 112 or relative position display region 115.

By providing a filtering function in this way, closed message exchange that is limited to among peers is possible.

(Exit of Chat Participant)

In response to a communication connection with a mobile device participating in the chat being disconnected via the wireless communication unit 20 by way of the connection processing unit 42, the first display mode control section 431 removes the member icon corresponding to this mobile device on the member display region 112B, and dynamically rearranges the member icons corresponding to all of the remaining mobile devices participating in the chat on the member display region 112B.

As a modified example of rearrangement, it may be configured so that only the member icon corresponding to the mobile device user for which communication connection was disconnected is made non-display on the member display region 112B, and the member icons corresponding to all of the remaining mobile devices remain displayed as is in the member display region 112B.

In addition, as a separate modified example, it may be configured so that, in the case of preparing member icon arrangement locations by dividing the member display region 112B associated with the unit information so as to be able to arrange a predetermined number of member icons in advance, the first display mode control section 431 eliminates the member icon of this mobile device on the member display region 112B associated with the unit information from the arrangement location thereof, in response to the communication connection with this mobile device being disconnected via the wireless communication unit 20. In addition, it may be configured so as to rearrange the member icons corresponding to all of the remaining mobile devices in the connection order.

(Association Between Message Icon and Member Icon)

The first display mode control section 431, as shown in FIGS. 4A to 4C, for example, displays in the first display region 111 the message icon corresponding to a message received from the other mobile device participating in the chat via the information receiving unit 21, to be associated with the member icon corresponding to this mobile device displayed in the member display region 112B, for example, by way of a balloon.

(Message Reception)

The first display mode control section 431 displays the message icon corresponding to a message received from the other mobile device as shown in FIGS. 4A to 4C, for example, on the message display region 111 of the display unit 11 to be associated with the member icon displayed in the member display region 112B, based on the data extracted by the connection processing unit 42, stylized (and fixed) message list 322, etc.

Figure 4E:
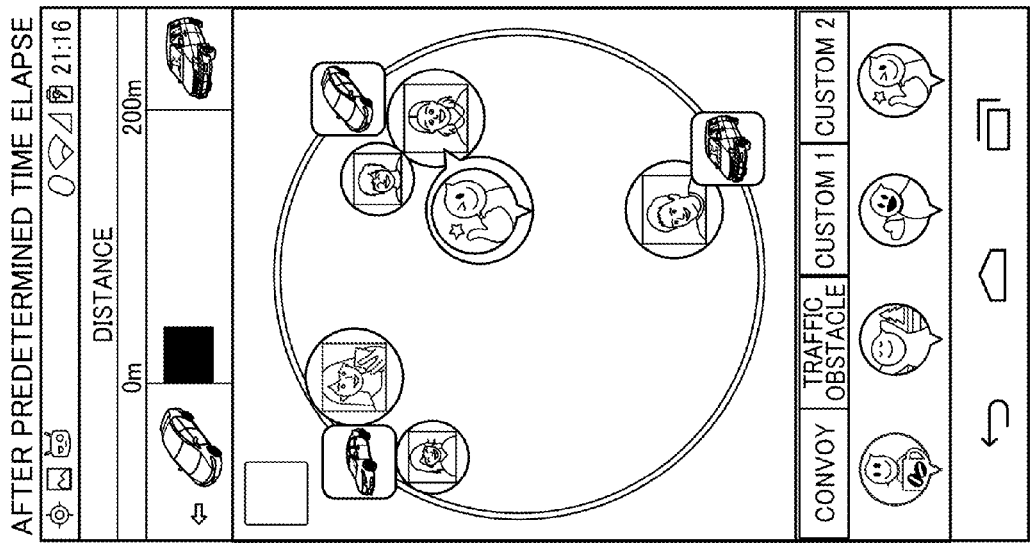
FIG. 4E is a view showing a display example of a message display region 111 of a message, in the case of the electronic device 2 of the first embodiment receiving this message.
Figure 4E:
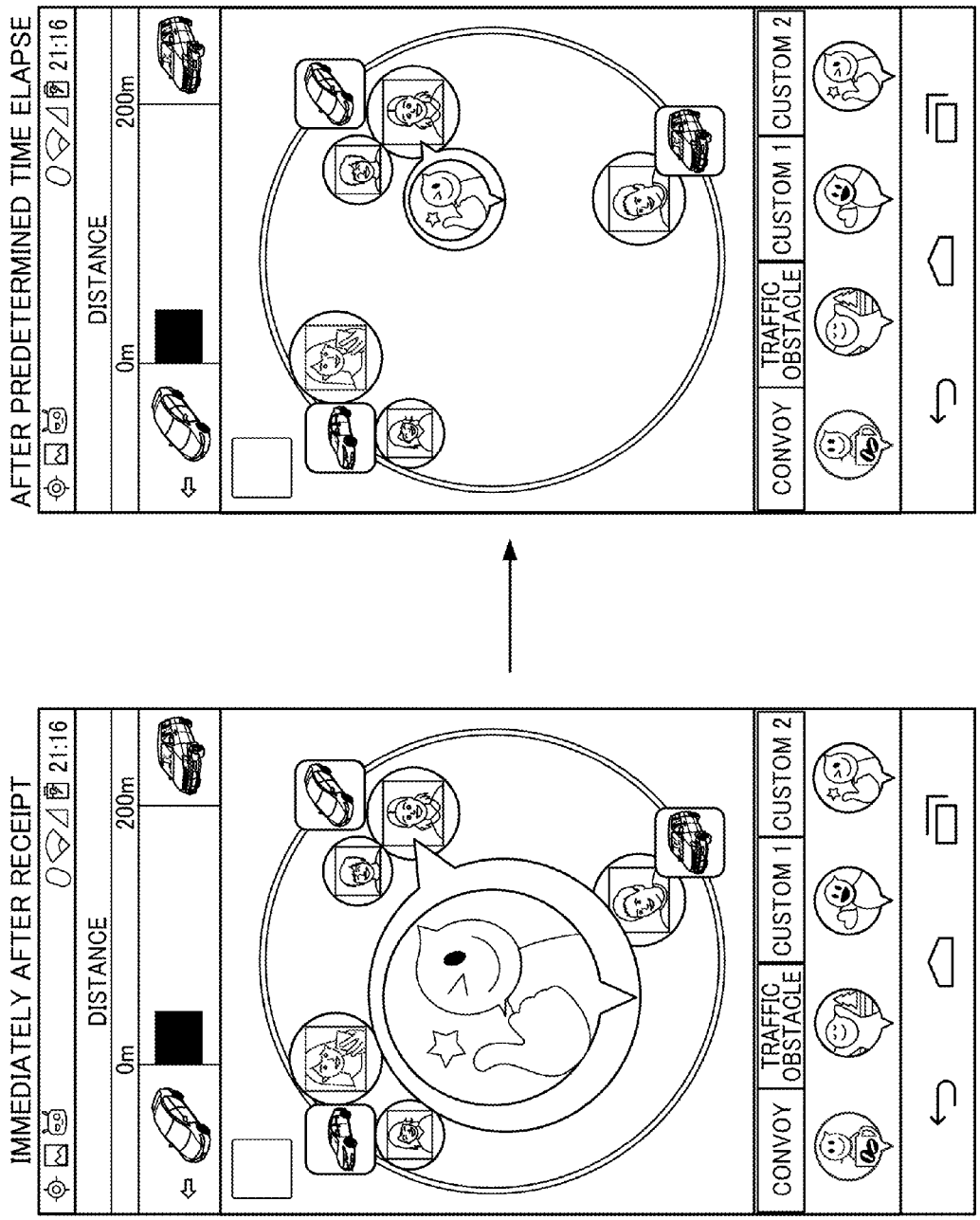

The first display mode control section 431, as shown in FIG. 4E, can emphasize that a new message has been received by displaying the corresponding message icon to be larger for a predetermined time immediately after receipt, in order to emphasize that a message arrived.

Subsequently, the first display mode control section 431 returns this message icon to the normal size with a predetermined time elapse.

Figure 4F:
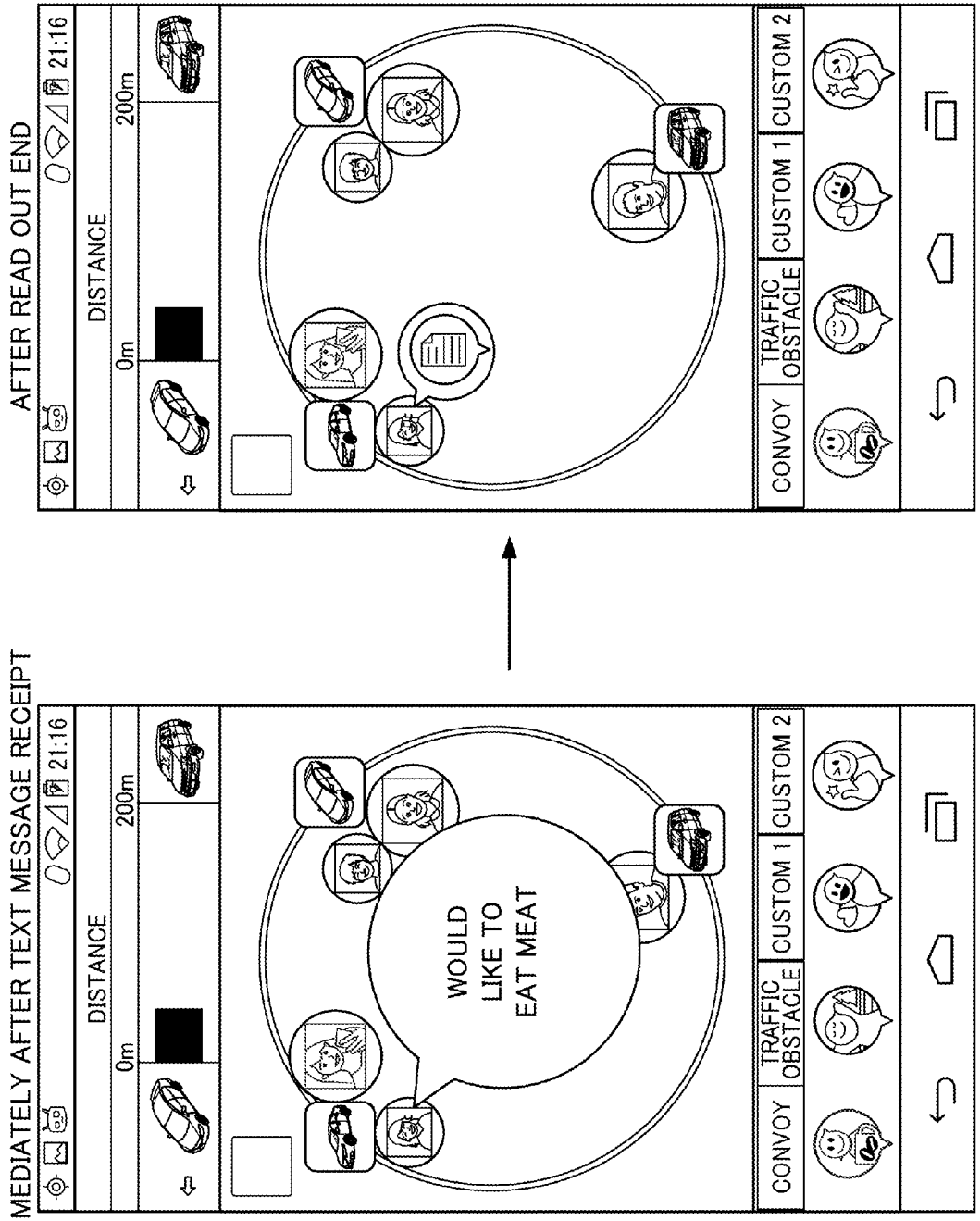
FIG. 4F is a view showing a display example of the first display region 111 of a text message, in a case of the electronic device 2 of the first embodiment receiving this text message.

Similarly, as shown in FIG. 4F, in the case of having received a text message, the first display mode control section 431 can establish display of text or reading out of text, by displaying the corresponding message icon to be large. After completion of display of text or reading out of text, this message icon is returned to the normal size.

Similarly, in the case of receiving a voice message, the first display mode control section 431 can display the corresponding message icon to be large, and playback the audio. When the audio playback ends, this message icon is returned to the normal size.

Similarly, in a case of receiving an image message, the first display mode control section 431 can perform image display. It should be noted that, after a predetermined time elapse, this message icon is returned to the normal size.

It should be noted that, in the case of the text message, voice message, and image message respectively being tapped by the user, the text message, voice message and image message are respectively displayed to be large, the display of text of text or reading out of text, playback of audio, and image display are performed, and after processing completion, can be returned to the normal size.

(Overwrite Display)

The first display mode control section 431, upon displaying a message icon corresponding to a received message in the first display region 111 to be associated with a user icon, in the case of the message icon corresponding to a previously received message being displayed, it is possible to overwrite the message icon corresponding to the received message over the message icon corresponding to the previously received message.

In addition, in the display of a message icon, the first display mode control section 431 can highlight display based on attributes related to the sender, information classification, information urgency, information importance, etc.

Information Setting Unit

For example, by using a template created in advance, or by the user directly creating, the information setting unit 44 can appropriately set the identification information ("member information") identifying the sender using this electronic device, or attribute information ("unit information") possessed by this sender, own vehicle model information, greeting message, etc. according to the time, place, situation, etc. In addition, the user can set a member icon expressing the identification information of the sender (user) as a character, and/or a unit icon expressing attribute information of this sender (user) as a character.

For example, in the case of setting the face of a person in the member icon, the face of a person set as the member icon is displayed on the display unit 11. In addition, in the case of setting the picture of a car as the unit icon, the car registered as the unit icon is displayed on the display unit 11.

The information setting unit 44 can set in advance the arrangement pattern classifications (A to C) designating in which arrangement pattern to display on the display unit 11, among the aforementioned three arrangement patterns A to C, according to the designation of the user.

In the case of a connection request or message sending to the other mobile device, the information setting unit 44 can set in advance whether to send only either of the member icon or unit icon as the user icon corresponding to the own device, or to send both icons, according to the instruction of the user.

The information setting unit 44 can set in advance the maximum value of the unit information (unit icon) displayed on the display unit 11 and maximum value of the respective member icons establishing the respective unit information as the attribute information.

By configuring in this way, for example, the first display mode control section 431 can divide in advance the display region by a maximum value and assign. Then, in response to a communication connection with a new mobile device being established, the first display mode control section 431 can dynamically rearrange the user icon in a free user icon arrangement location.

The information setting unit 44 can provide a filtering function that sets in advance the allowance of message receipt from another mobile device, and allowance of message display from the other mobile device, according to the instruction of the user. For this filtering function, it may be configured to be performed as member units or unit units.

By providing a filtering function, closed message exchange that is limited to among peers is possible.

(Traffic Lane Setting for Relative Position Display)

The information setting unit 44 can set so as to make one traffic lane display or two traffic lane display in the relative position display region 115.

It should be noted that the setting information set in advance by the information setting unit 44 can be changed according to the instruction of the user, during running of the first display mode control section 431. By configuring in this way, it is possible to change the display method flexibly.

Message Processing Unit

The message processing unit 45, in the case of sending communication information according to an instruction of the user to the other mobile device participating in the chat, acquires the current position of the own vehicle 1 via the GPS processing unit 31, and acquires the current time from a clocking unit (not illustrated), generates communication information based on the connection table 323, and sends the communication information to the other information transmitting source via an information sending unit 22.

(Sending of Message)

In response to one message icon having been selected from a list of a plurality of message icons displayed in the aforementioned third display region 113 according to a tap operation by the user, for example, the message processing unit 45 sends a stylized (and fixed) phrase message corresponding to the message icon selected to a mobile device corresponding to the user icon displayed in the user display region 112 of the display unit 11 based on the connection table 323, via the wireless communication unit 20.

In addition, in response to a text button 1145 on the left button widget 114B being depressed or tapped by the user, the message processing unit 45 can collect the text to generate a text message, and send this text message to the mobile device corresponding to the user icon displayed in the user display region 112 via the wireless communication unit 20.

In response to a voicemail button 1143 on the left button widget 114B being depressed or tapped by the user, the message processing unit 45 can create a voicemail, and send this voicemail to the mobile device corresponding to the user icon displayed in the user display region 112, via the wireless communication unit 20.

In response to the camera image button 1144 on the left button widget 114B being depressed or tapped by the user, the message processing unit 45 can generate an image message, and send this image message to the mobile device corresponding to the user icon displayed in the user display region 112, via the wireless communication unit 20.

(Setting of Destination)

Figure 4G:
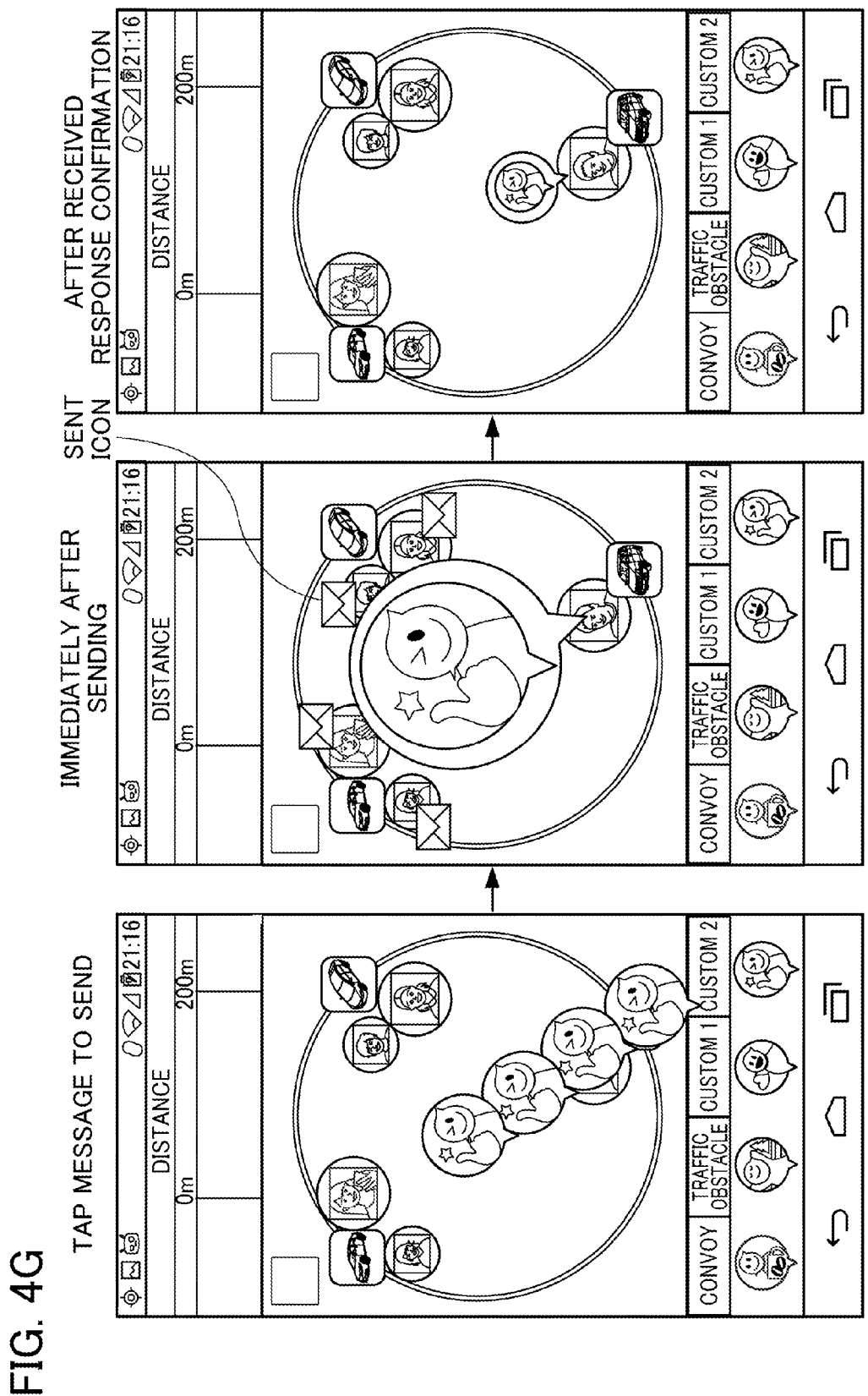
FIG. 4G is a view showing a screen transition example of a case of the electronic device 2 of the first embodiment sending a message.

The message processing unit 45 sets the delivery address according to the tap operation of the user. For example, in the case of the arrangement pattern A, as shown in FIG. 4G, if the center of the display unit 11 is tapped according to a tap operation of the user, the delivery address is set to the entire group. In addition, in the case of a specific user icon being tapped from among the user icons arranged in the user display region, according to a tap operation of the user, the delivery address is set to the mobile device corresponding to this specific user icon.

It should be noted that, as the default setting, in the case of one message icon having been selected from the list of a plurality of message icons displayed in the aforementioned third display region 113, according to a tap operation of the user, for example, it may be configured so as to send to the entire group.

(Setting and Sending of Message)

In a case of one message icon having been selected from the list of a plurality of message icons displayed in the aforementioned third display region 113, according to a tap operation of the user, for example, the message processing unit 45 sets the delivery address based on the connection table 323, sets the communication address of the own device in the sending source address, creates a communication record setting the user information of the user using the own device, identification ID of the message icon corresponding to the selected stylized (and fixed) phrase message, time information, GPS information of the own device, etc. in the sent data unit, and then sends to the mobile device corresponding to the user icon displayed in the user display region of the display unit 11, via the information sending unit 22.

As shown in FIG. 4G, in the case of selecting a message icon, it may be configured so as to enable intuitive understanding of sending of a message, by executing an animation like that of a message icon moving to the destination (i.e. in the case of the destination being the entire group, to the center of the display unit 11, and in the case of the destination being a specific mobile device, to the corresponding user icon). Then, the first display mode control section 431 can display the message icon corresponding to the above-mentioned stylized (and fixed) phrase message sent by the own device by way of a balloon, for example, to be associated with the user icon corresponding to the own device displayed in the user display region. It should be noted that, immediately after message sending, the sent message can be displayed to be large in order to emphasize as having been sent, and then after the elapse of a predetermined time, this sent message can be returned to normal size.

The message processing unit 45 can store this sent information in the sent information history part 324 as log information.

As shown in FIG. 4G, after message sending, the first display mode control section 431 can display the icon of a closed envelop (hereinafter referred to as "sent icon"), for example, so that the state is understood of being during sending to the user icon of the delivery address, for example, until receiving a received response from the mobile device that is the delivery address. In the case of the message processing unit 45 receiving a received response, the first display mode control section 431 sets this sent icon from the corresponding mobile device to non-display. By configuring in this way, the own device enables intuitive understanding of whether the delivery address has received the sent message.

The first display mode control section 431 returns this message icon to the normal size in a predetermined time elapse.

Figure 4H:
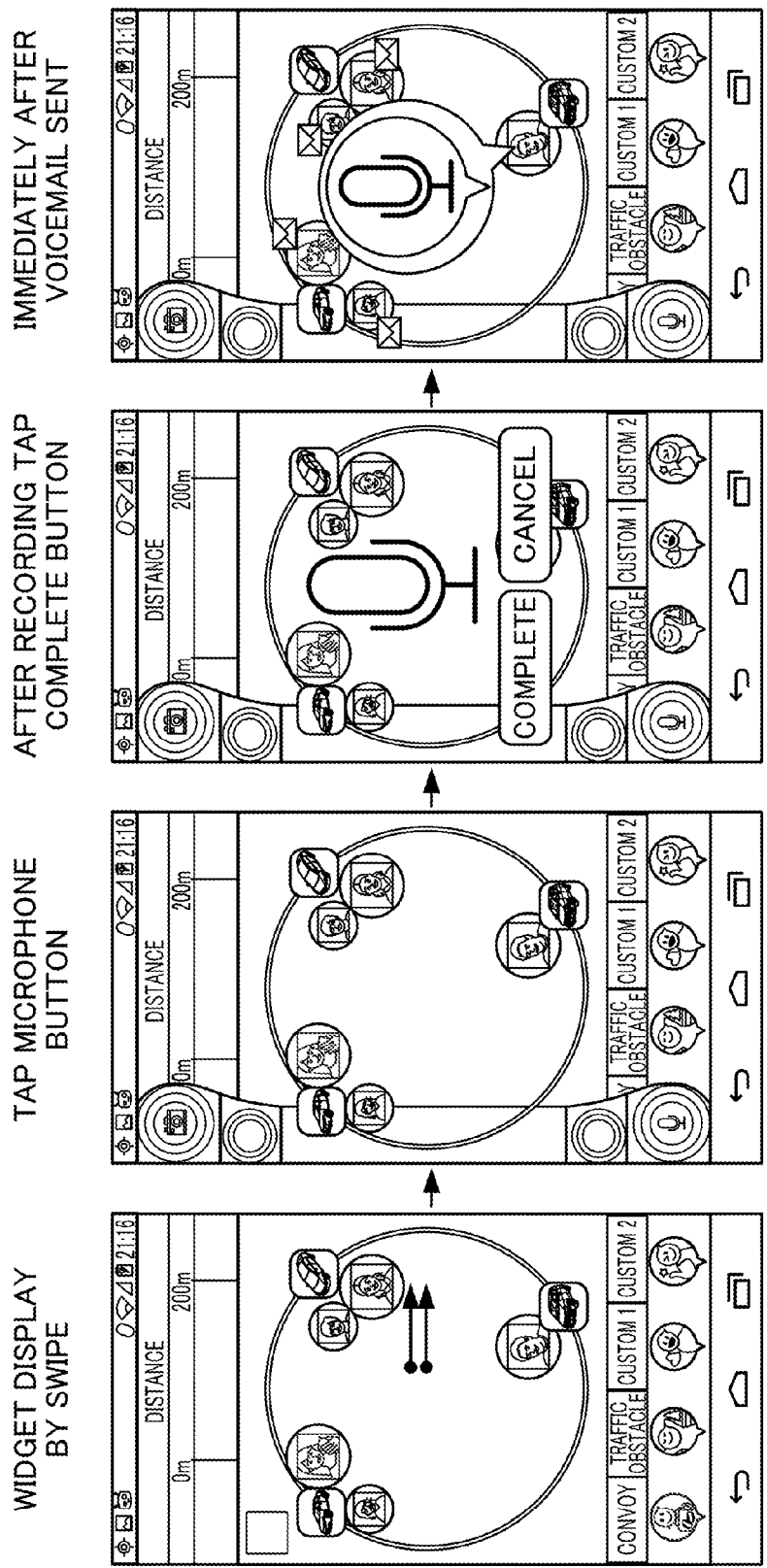
FIG. 4H is a view showing a screen transition example of a case of the electronic device 2 of the first embodiment sending a voicemail.

As shown in FIG. 4H, in the case of the voicemail button 1143 on the aforementioned left button widget 114B being depressed or tapped, for example, by the user, the message processing unit 45 allows the user to input audio, sets the delivery address based on the connection table 323, sets the communication address of the own device in the source address, creates a communication record setting the user information (identification information of user and/or attribute information of user) of the user using the own device, voicemail, time information, GPS information of the own device, etc. in the sent data unit, and then sends to the mobile device corresponding to the user icon displayed in the user display region of the display unit 11, via the information sending unit 22.

Upon doing so, the message processing unit 45 can store this sent information in the sent information history part 324 as log information.

In addition, also in the case of the camera image button 1144 on the left button widget 114B being depressed by the user, the message processing unit 45 can perform processing of the image message similarly to the processing on and after the voicemail button 1143 is depressed.

The embodiments of these functional units of the electronic device 2, for example, the wireless communication unit 20, GPS processing unit 31, control unit 40, relative position calculation unit 41, connection processing unit 42, display control unit 43, first display mode control section 431, information setting unit 44, message processing unit 45, etc., can be implemented as computer programs for executing by a programmable processor or programmable computer.

In addition, it can also be implemented in the form of a special purpose logical circuit, for example, FPGA or ASIC, firmware, or digital electronic circuit.

In addition, it may be realized by recording a program for realizing the functions of the electronic device 2 in a computer-readable recording medium, reading the program recorded on this recording medium into a computer and executing.

The "computer" referred to herein includes the OS and hardware such as peripheral devices. In addition, the "computer-readable recording medium" includes portable media such as a floppy disk, magneto optical disk, ROM and CD-ROM; storage devices such as a hard disk installed in a computer system; and the like.

In addition, the method steps of one embodiment of the present invention can be implemented by the electronic device 2 for implementing the functions of one embodiment of the present invention.

In addition, the method steps of one embodiment of the present invention can be implemented by one or a plurality of programmable processors or computers that execute a computer program for implementing the functions of one embodiment of the present invention.

In addition, the method steps can also be implemented by a special purpose logical circuit, for example, FPGA or ASIC, firmware, or digital electronic circuit.

As stated above, upon making a conversation of chat format by using the communication information, an atmosphere of persons not speaking also being present inside the loop of the story is made, whereby it is possible to bring about an atmosphere where the conversation is being enjoyed by everyone and perform the exchange of messages in an enjoyable manner. In addition, in the case of doing a certain activity together in a group, it is possible to create an atmosphere in which a feeling of solidarity of the group, group feeling, and sense of unity as a community can be enjoyed.

(Effects According to First Embodiment)

The following such effects are exerted by the program, method and electronic device 2 for performing message exchange of the above-mentioned embodiment explained in the foregoing.

By way of the program, method and electronic device 2 for performing the stylized (and fixed) phrase message exchange of the above-mentioned embodiment, the unit display region 112A and member display region 112B associated with the user display region 112A are provided, and the unit information and user information are displayed by arranging in the unit display region 112A and the member display region 112B associated with the unit display region 112A, respectively.

Since the senders (speakers) are organized and displayed based on unit information, in addition to information of "who is the sender (speaker)", it is thereby possible to intuitively understand information like "to which unit does the sender (speaker) belong" (e.g., riding in which car, belonging to which family, belonging to a unit going to which destination). By configuring in this way, it is possible to facilitate imagining the situation of the sender (speaker), and thus aid in understanding of the received message information.

In addition, information can be effectively presented on the display unit 11 of limited area. Furthermore, since the arrangement positions are allocated based on the unit information, the screen is organized, and thus information tends to be intuitively understood. In addition, it is possible to render an enjoyable atmosphere.

Furthermore, in response to a communication connection with a new mobile device being established via the wireless communication unit 20, the member icon corresponding to the new member is dynamically introduced into the loop of member icons of chat members up to that time.

Since the positions thereby change every time the number of communication connections increases, the change on the screen is great, and thus the matter of the connections increasing is easily understood intuitively. By configuring in this way, even in the case of a new member participating in a chat, an atmosphere in which the new member is also naturally added into the loop of the story is made, whereby it is possible to bring about an atmosphere where the conversation is being enjoyed by everyone and perform the exchange of messages in an enjoyable manner.

Second Embodiment

Next, a second embodiment of the present invention will be explained while referencing the drawings. In the first embodiment of the present invention, the display control unit 43 performs display control by way of the first display mode control section 431 (referred to also as "first display" or "full-screen display"); however, in the second embodiment, in addition to the display control (full-screen display) by way of the first display mode control section 431, the display control unit 43 can perform display control to display the own device position on a map (referred to also as "second display" or "map display") by way of a second display mode control section 432. Furthermore, it is possible to switch between first display (full-screen display) and second display (map display) according to the instruction of the user.

The configuration related to display control according to the first display mode control section 431 is the same as the first embodiment, and thus explanation thereof will be omitted. Herein, the second display and display switching will be explained.

It should be noted that the system configuration of the electronic device 2 in the second embodiment is basically the same as the system configuration of the electronic device 2 in the first embodiment. Herein, portions that differ from the system configuration of the electronic device 2 in the first embodiment will be explained. The same reference numbers are assigned to similar configurations to the first embodiment, and explanations thereof will be omitted.

Figure 6:
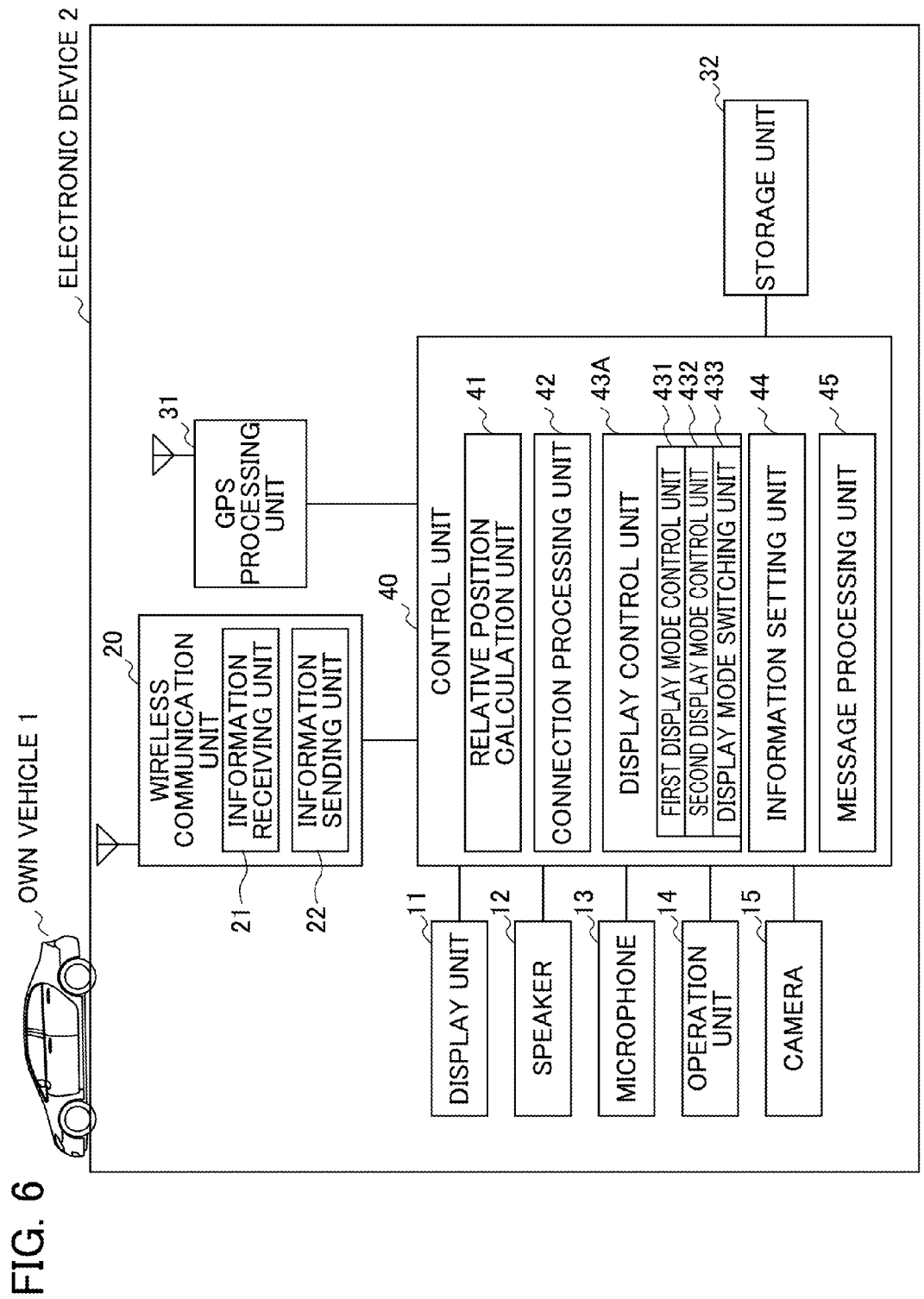
FIG. 6 is a block diagram showing the functional configuration of an electronic device 2 of a second embodiment.

As shown in FIG. 6, the control unit 40 of the second embodiment includes the relative position calculation unit 41, connection processing unit 42, display control unit 43, information setting unit 44 and message processing unit 45. The display control unit 43 is configured to include the first display mode control section 431, second display mode control section 432 and display mode switching unit 433.

(Second Display)

The map display by the second display mode control section 432 will be explained. It should be noted that the same reference numbers are assigned to similar configurations to the display of the first display (full-screen display), and explanations thereof will be omitted.

The second display screen by the second display mode control section 432 (map display screen prioritizing the own device position display on the map) is shown in FIGS. 7A to 7I.

In FIG. 7B exemplified below, the member icon is displayed as the user icon; however, it is not limited to only the member icon.

Figure 7A:
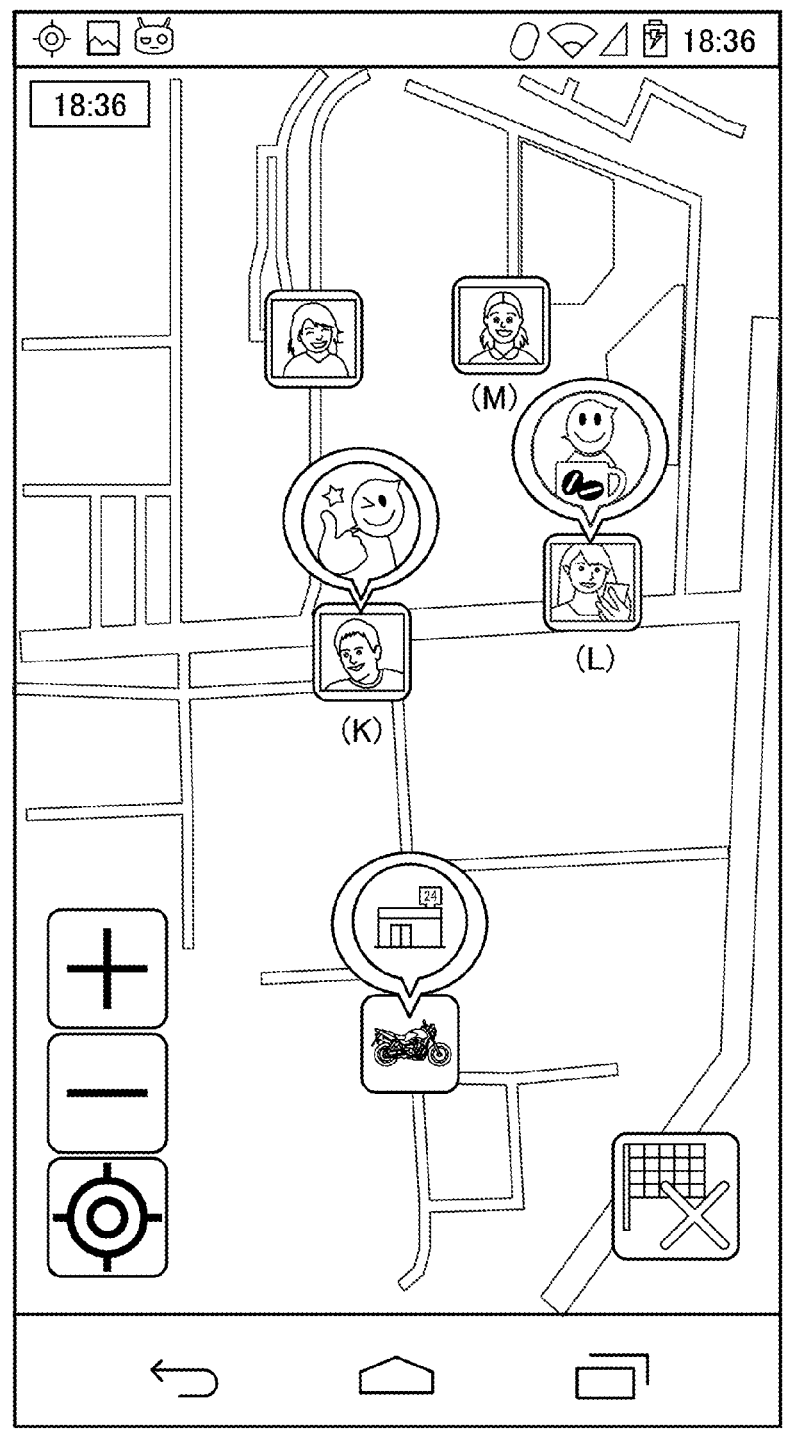
FIG. 7A is a view showing an example of a second display (map display) of the second embodiment.
Figure 7C:
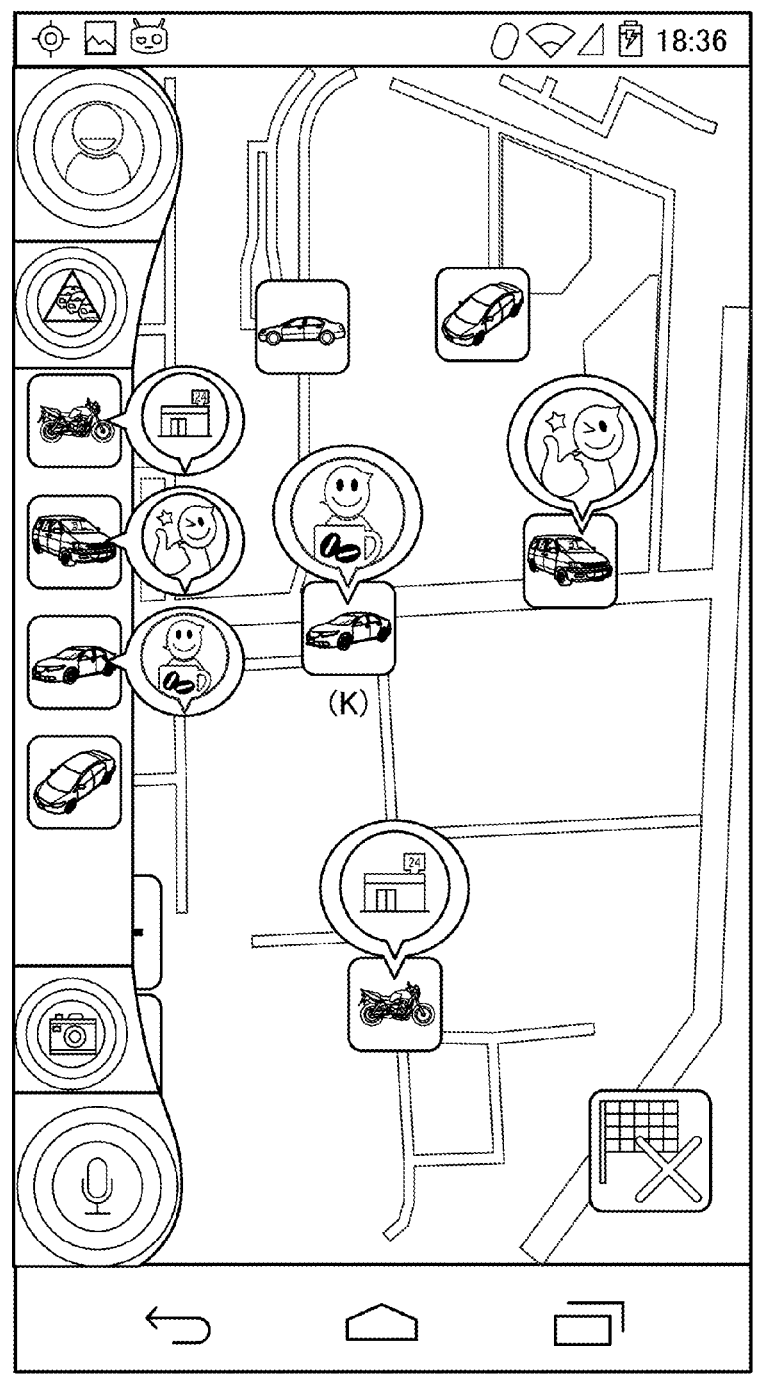
FIG. 7C is a view showing another display example displaying the second button widget 114B on the second display (map display) of the second embodiment.

An example of a case of displaying the unit icon as the user icon is shown in FIG. 7C.

In this way, for a user belonging to a unit group, it is possible to display not the individual member icon as a user icon, but rather the unit icon.

Similarly to the case of full-screen display, it is possible to set in advance on the receiving side whether to display either of the member icon or unit icon as the user icon of the sender on the map display screen, by way of the information setting unit 44 according to the designation of the user.

In addition, upon making to slide-in/slide-out by way of a swipe movement on the second button widget 114B, it is possible to make so as to be selected and set according to the number of times continuously repeating slide-in/slide-out.

For example, it may be configured so as to establish member icon display with a one time operation, and establish unit icon display by consecutively repeating two times.

Display of Currently Traveled Road Map

As shown in FIG. 7A, similarly to the first embodiment, the currently communicable mobile device is identified by the user icon represented as a character, and the user icon (L), etc. corresponding to currently communicable mobile devices are displayed together with the user icon (K) corresponding to the own device on the currently traveled road map displayed on the display unit 11. The user icon (K) corresponding to the own device is displayed on the currently traveled road map based on the current position of the own device calculated by the GPS processing unit 31. In addition, the user icon (L), etc. corresponding to other mobile devices are displayed on the currently traveled road map, based on the current positions of the other mobile devices calculated based on the GPS information including the longitude and latitude of the other mobile devices received via the information receiving unit 21 of the wireless communication unit 20.

Herein, the user icon corresponding to the own device, in the case of north-up display for example, can be displayed so as to be positioned at substantially the center on the road map displayed on the display unit 11. In addition, in the case of head-up, it is possible to display at the lower side on the road map displayed on the display unit 11.

In addition, as shown in FIG. 7A, the message icon corresponding to the message (for example, "convenience store") received from the other mobile device (L) is displayed above this user icon (L), for example, to be associated with the user icon (L) corresponding to the other mobile device (L), on the currently traveled road map displayed on the display unit 11.

Furthermore, on the currently traveled road map displayed on the display unit 11, it is possible to display the message icon corresponding to the most recent message sent by the own device (for example, "roger") above this user icon, for example, to be associated with the user icon (K) corresponding to the own device displayed on the road map.

(Second Button Widget 114B)

As shown in FIG. 7B, the second display mode control section 432 can display a widget (hereinafter also referred to as "second button widget 114B") that includes a variety of operation buttons on the left side, for example, on the display unit 11 in the second display.

Figure 7D:
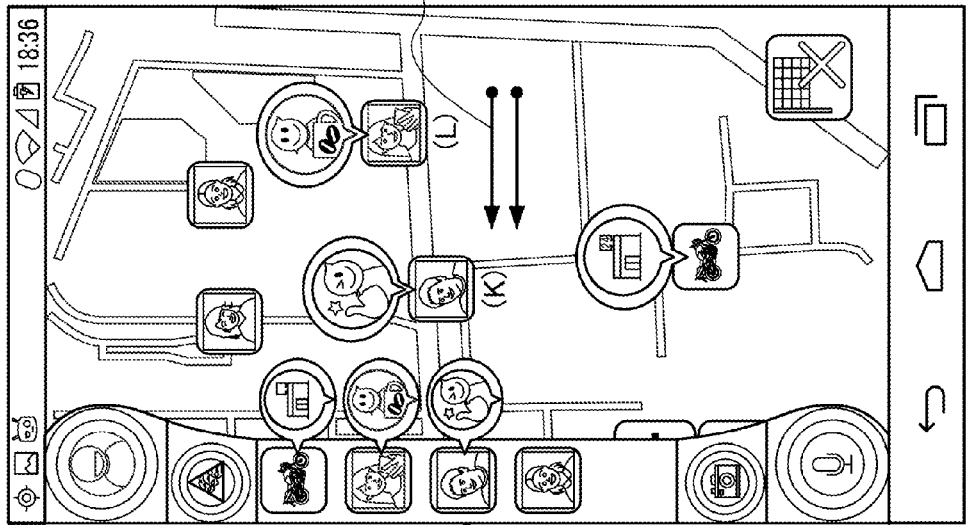
FIG. 7D is a view showing an operation example of slide-in/slide-out of the second button widget 114B on the second display (map display) of the second embodiment.
Figure 7D:
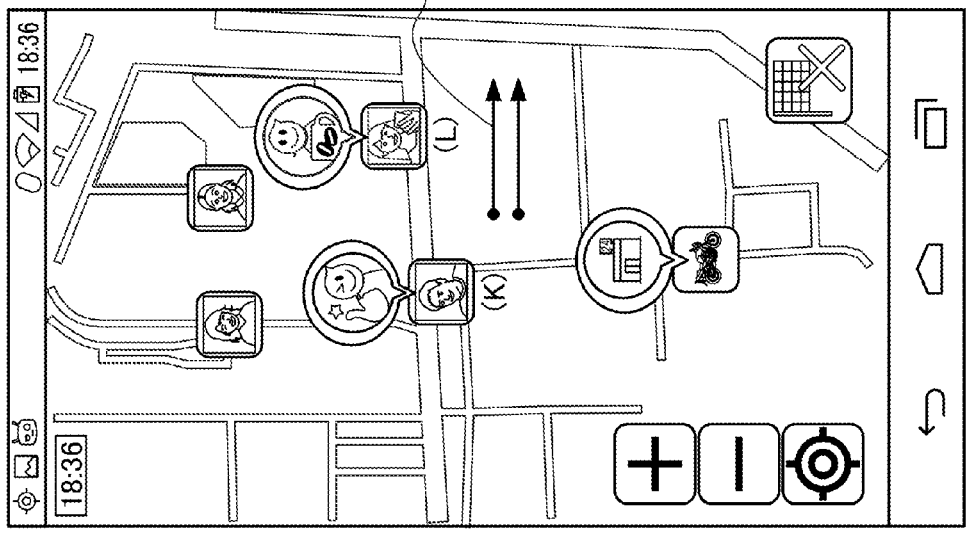

As shown in FIG. 7D, the second button widget 114B, similarly to the button widget 114 in the first display, can be made to slide-in/slide-out on the display unit 11 by way of a swipe operation of two fingers, for example.

The second button widget 114B can include a display switching button 1141B, message icon selection button (referred to also as "first icon selection button") 1142B, voicemail button 1143, camera image button 1144, etc. In addition, as described later, the user icons corresponding to currently communicable mobile devices are displayed in the display region (hereinafter also referred to as "user icon display region B") at the center of the second button widget 114B.

It should be noted that the voicemail button 1143 and camera image button 1144 are the same as the voicemail button 1143 and camera image button 1144 of the button widget 114 in the first display, respectively, and thus explanations thereof will be omitted.

(User Icon Display Region B)

As shown in FIG. 7B, the user icons corresponding to a currently communicable mobile devices are displayed in the user icon display region B of the second button widget 114B on the display unit 11.

It may be configured so that the user icons displayed in the user icon display region B include the user icon corresponding to the own device.

In this case, in order to distinguish between the user icon corresponding to the own device and the user icons corresponding to the other mobile devices, for example, it may be configured so that the region displaying the user icon (K) corresponding to the own device will be above the region displaying the user icon (L), etc. corresponding to the other mobile devices. In addition, it may be configured to display in connection order including the own device (K).

(Display of New Chat Participant)

As shown in FIG. 7F, in the second display, in response to a communication connection with a new mobile device being established via the wireless communication unit 20 by way of the connection processing unit 42, the second display mode control section 432 dynamically additionally arranges the user icon corresponding to the new mobile device on the user icon display region B of the second button widget 114B. At the same time, the user icon corresponding to the new mobile device is additionally arranged on the currently traveled road map.

(Exit of Chat Participant)

As shown in FIG. 7G, in the second display, in response to a communication connection with a mobile device participating in the chat being disconnected via the wireless communication unit 20 by way of the connection processing unit 42, the second display mode control section 432 dynamically rearranges the user icons corresponding to all of the remaining mobile devices participating in the chat on the user icon display region B of the second button widget 114B. At the same time, the user icon corresponding to this mobile device that had been displayed on the currently traveled road map is set to non-display.

It should be noted that, in the example illustrated in FIG. 7G, it is displaying in connection order including the own device (K) on the user icon display region B.

By configuring in this way, the user can easily understand intuitively the users newly participating in the chat or user exiting from the chat.

(Message Receipt)

In the second display, the second display mode control section 432 can display, as shown in FIG. 7H, the corresponding message icon to be larger for a predetermined time immediately after receipt, in order to emphasize that a message arrived. Subsequently, this message icon is returned to normal size after a predetermined time elapse.

Also in the second display, in the case of receiving a text message (framed display), similarly to the case of first display mode, the second display mode control section 432 can make the display of text or read-out of text by displaying the corresponding message icon (framed display) to be large. After the completion of the display of text or read-out of text, this message icon (framed display) is returned to normal size.

Also in the case of receiving a voice message or image message, the second display mode control section 432 performs enlarged display similarly to the case of the first display (full-screen display).

(Overwrite Display)

In the second display, upon displaying on a currently traveled road map of the display unit 11 a message icon corresponding to a message received to be associated with a user icon (for example, L) displayed in the user icon display region B, in the case of the message icon corresponding to a previously received message being displayed, the second display mode control section 432 can overwrite the message icon corresponding to the received message on the message icon corresponding to the previously received message.

By configuring in this way, a user can easily understand the positional relationship intuitively by the displaying of stylized (and fixed) phrase messages received from the other mobile devices according to association between the user icons and message icons displayed on the road map.

(Message Sending)

Figure 7I:
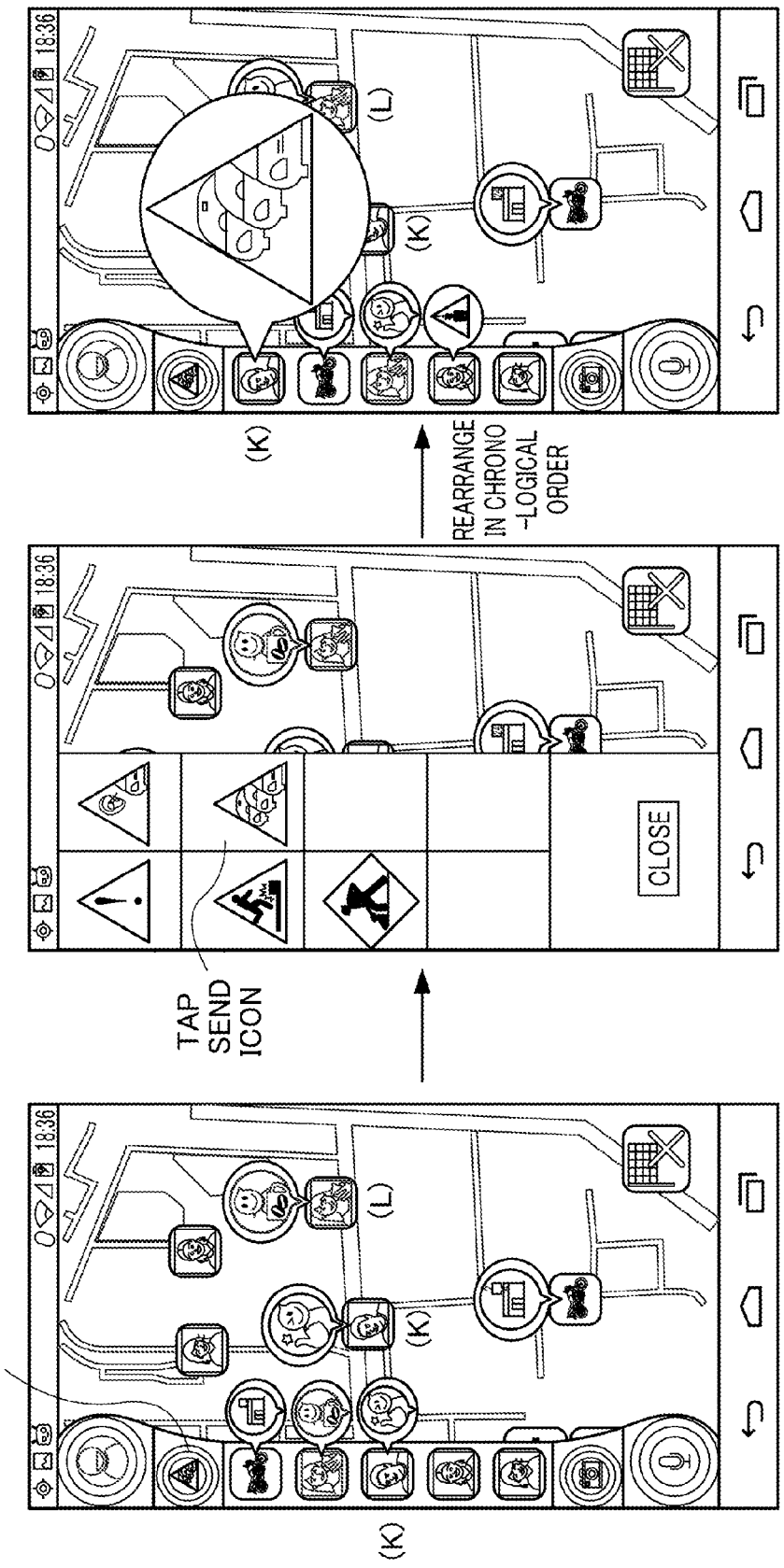
FIG. 7I is a view showing a screen transition example in a case of sending a message, in the second display (map display) of the second embodiment.

Next, message sending processing of the second display mode will be explained while referencing FIG. 7I. It should be noted that the same reference numbers are assigned to similar configurations to the message sending processing of the first display mode, and explanations thereof will be omitted.

The message processing unit 45, in the case of sending communication information according to an instruction of the user to the other mobile device, acquires the current position of the own vehicle 1 via the GPS processing unit 31, and acquires the current time from a clocking unit (not illustrated), creates communication information, and sends the communication information to the other information sending source via the information sending unit 22.

(Message Icon Selection Button 1142B)

By the message icon selection button 1142B provided to the second button widget 114B being depressed, a predetermined selection panel table (hereinafter also referred to as "message icon selection panel table") is displayed on the display unit 11, and a list of message icons corresponding to selectable stylized (and fixed) phrase messages is displayed.

In the case of sending a stylized (and fixed) phrase message to another mobile device, by the user selecting a message icon corresponding to a stylized (and fixed) phrase message sought to be sent by way of a tap, etc., for example, from a list of message icons displayed in the message icon selection panel table, the message processing unit 45 sends the stylized (and fixed) phrase message corresponding to the selected message icon to the mobile device corresponding to the user icon displayed in the user icon display region B, via the wireless communication unit 20.

It should be noted that it is possible to display by dividing the display of message icons in the message icon selection panel table into two stages. In this case, among the two stages, it is possible to make one as a fixed format aligning predetermined message icons, and make the other one a variable format switchable (scrollable) by way of a flip or the like, for example. It is possible to improve the operability by allocating messages having a high frequency of use or messages that can reply to an immediate reply demand to the one stage on the fixed side.

The message processing unit 45 stores this sent information in the sent information history unit 324 as log information.

The second display mode control section 432 can rearrange on the user icon display region B of the second button widget 114B in latest chronological order, including the own device (K).

In the second display, the second display mode control section 432 displays the message icon corresponding to the above-mentioned stylized (and fixed) phrase message sent by the own device to be associated with the user icon corresponding to the own device displayed in the user icon display region B to be next thereto, for example. It should be noted that, immediately after message transmission, the sent message can be displayed to be large in order to emphasize as having been sent, and then after the elapse of a predetermined time, this sent message can be returned to normal size.

(Overwrite Display)

In the second display, upon displaying a message icon corresponding to a message received on a currently traveled road map of the display unit 11, or to be associated with a user icon (for example, L) displayed in the user icon display region B, in the case of the message icon corresponding to a previously received message being displayed, the second display mode control section 432 can overwrite the message icon corresponding to the received message on the message icon corresponding to the previously received message.

It should be noted that a message icon corresponding to a message sent by the own device can be similarly overwritten.

In this way, it is possible to easily understand intuitively the user icon corresponding to the mobile devices including currently communicable own device and the message icon corresponding to the latest message transmitted by this mobile device, while prioritizing the currently traveled road map information.

Display Mode Switching Unit

As shown in FIG. 7E, in a state in which the map display screen prioritizing the own device position display on the road map is being displayed by the second display mode control section 432 on the display unit 11, it is possible to switch to display (full-screen display) by the first display mode control section 431 by slide-in of the second button widget 114B and tapping (or clicking) the screen switching button 1141B.

Similarly, as shown in FIG. 7E, in a state in which full-screen display is being displayed by the first display mode control section 431 on the display unit 11, it is possible to switch to display (map display) by the second display mode control section 432 by tapping (or clicking) the aforementioned back key.

In the above way, it is possible to enjoy the ideal screen display according to the time, place, case, etc., by the user switching between the map display screen on which the interchange of messages is possible, while confirming the positions of the own device and other devices on the currently traveled road map, and chat display by the full-screen display. Then, it is possible to provide proper uses in the case of prioritizing the display of chat information and the case of prioritizing the own device position display, and thus the convenience for the user can be improved.

In addition, in the case of wanting to obtain detailed map information including the own device position, since it is possible to switch the screen from full-screen display to map display by way of a tap operation by the user, it is possible to view without interrupting information.

In addition, in the case of wanting to obtain the details of information sent and received, since it is possible to switch the screen from map display to full-screen display by way of a tap operation by the user, the message information is displayed to be larger than other information in the display unit 11; therefore, the visibility can be improved. Furthermore, since the relative position information is understood at the same time collectively with a message, it is possible for the receiver to understand the relationship with the sender, the situation of the sender, etc., and thus it is possible to aid in message understanding and support driving information.

The embodiments of functional units of the electronic device 2, for example, the wireless communication unit 20, GPS processing unit 31, control unit 40, relative position calculation unit 41, connection processing unit 42, display control unit 43, first display mode control section 431, second display mode control section 432, display mode switching unit 433, information setting unit 44, message processing unit 45, etc. can be realized as computer programs for executing by a programmable processor or programmable computer.

In addition, the method steps of one embodiment of the present invention can be implemented by realizing the electronic device 2 for implementing the functions of one embodiment of the present invention.

In addition, the method steps of one embodiment of the present invention can be implemented by one or a plurality of programmable processors or computers that execute a computer program for implementing the functions of one embodiment of the present invention.

In addition, the method steps can also be implemented by a special purpose logical circuit, for example, FPGA or ASIC, firmware, or digital electronic circuit.

(Effects According to Second Embodiment)

The following such effects are exerted according to the second embodiment explained above.

By way of the program, method and electronic device 2 for performing the stylized (and fixed) phrase message exchange of the above-mentioned embodiment, switching by a user between a chat display form by way of full-screen display and a chat display form on a map display screen that prioritizes the own device position display on a road map is made possible on the display unit 11 of the electronic device 2.

It is thereby possible to enjoy the ideal screen display depending on the time, place, case, etc., by a user switching between a map display screen on which the interchange of messages is possible while confirming the positions of the own device and the other devices on the currently traveled road map, and chat display by way of full-screen display.

Then, it is possible to provide proper uses in the case of prioritizing the display of chat information and the case of prioritizing the own device position display, whereby the convenience for the user is improved.

Although preferred embodiments of the present invention are explained above, the present invention is not to be limited to the aforementioned embodiments, and modifications are possible where appropriate.

The display examples of the display unit 11 according to the first embodiment and second embodiment establish portrait screens as examples; however, it is not limited to portrait screens. It may be established as landscape instead of portrait. In addition, it may be established as portrait/landscape automatic switching. In other words, it may switch between portrait and landscape display automatically by tilting the electronic device 2.

Although messages in the first embodiment and second embodiment are associated with icons, it is not limited to icons. A short text message may be displayed directly on the display unit 11. For example, it may be a message written inside a balloon, i.e. framed character display.

Although the display unit 11 of the electronic device 2 according to the second embodiment is one screen, as a modified example, the display unit 11 may be a unit equipped with two or more screens.

By configuring in this way, it is made possible to display a chat display screen by the first display mode (full-screen display) according to the display control unit 43A on one screen of the display unit 11, and to display a chat display screen on the navigation screen that prioritizes the own device position display on a road map by the second display mode (road map display) according to the second display mode control section 432 on the other screen thereof.

In this case, without switching the display mode of the display unit 11, it is possible to parallel display: a chat display on a navigation screen that enables confirming the positions of the own device and other devices on a currently traveled road map; and a chat display by full-screen display whereby it is possible, upon making a conversation of chat format, to make an atmosphere of persons not speaking also being present inside the loop of the story, thereby bringing about an atmosphere where the conversation is being enjoyed by everyone, and thus perform the exchange of messages in an enjoyable manner.

What is claimed is:

1. A method comprising an electronic device including a display unit and a wireless communication unit to display information including user information related to a sender and message information desired by the sender to be transmitted to a correspondence party which are sent and received via the wireless communication unit, wherein the user information includes identification information of the sender and attribute information of the sender, wherein the attribute information of the sender is group information indicating a group to which the sender belongs based on a vehicle ridden by the sender, a family of the sender, or a destination associated with the sender, wherein the attribute information of the sender is set upon the sender departing by riding in the vehicle, a display mode control step of the electronic device providing a first display position associated with the attribute information to the display unit, and displaying the identification information and the attribute information simultaneously, on one screen, by arranging at the first display position, wherein the display mode control step includes:

a step of displaying at least either of identification information of an own device user or attribute information of the own device user as an icon, by providing a first display position associated with the attribute information of the own device user and arranging therein;

a step of setting one other first display position with reference to the first display position associated with the attribute information of the own device user, and displaying at least either of identification information of a sender or attribute information of a sender other than the own device user as an icon, by arranging in the other first display position;

a step of assigning a display region for displaying the icon to a plurality of divided display regions based on a number of electronic devices connected with the own device including the own device user;

the step of displaying at least either of identification information of the own device user or attribute information of the own device user as an icon, by providing a first display position associated with the attribute information of the own device user in one of the divided display regions among the plurality of divided display regions thus assigned, and arranging therein; and a step of displaying as an icon at least either of identification information of each sender other than the own device user or attribute information of an affiliation of the sender, with reference to the first display position associated with the attribute of the own user, by respectively providing, and arranging therein, a first display position associated with the attribution information of each of the senders to the respective divided display regions other than a first display position associated with attribute information of the own device user that has been set;

wherein the display unit or the wireless communication unit are implemented via a processor.

2. The method according to claim 1, wherein the display mode control step further includes:
   a step of setting a plurality of the first display positions respectively associated with a plurality of attribute information in the display unit; and
   a step of simultaneously displaying at least either of the identification information or the attribute information of each sender, sent and received from a plurality of senders, by arranging at one of the plurality of first display positions.

3. The method according to claim 2, wherein the wireless communication unit performs direct wireless communication.

4. The method according to claim 1, wherein the wireless communication unit performs direct wireless communication.

5. The method according to claim 1, wherein the display mode control step includes:
   a step of dividing a display region for displaying the icons by a number set in advance to establish a plurality of divided display regions; and
   a step of providing a first display position associated with the attribute information of the sender in each of the divided display regions among the plurality of divided display regions, and displaying at least either of the identification information of the sender or the attribute information of the sender by arranging in the first display position.

6. The method according to claim 5, wherein the wireless communication unit performs direct wireless communication.

7. A method comprising an electronic device including a display unit and a wireless communication unit to display on the display unit information including user information related to a sender and message information desired by the sender to be transmitted to a correspondence party which are sent and received via the wireless communication unit,
   wherein the user information comprises identification information of the sender and attribute information of the sender,
   display mode control step of the electronic device displaying the identification information of the sender to be associated with the attribute information, in a case of displaying the attribute information of the sender on the display unit, when sending and receiving at least the information,
   wherein the identification information and the attribute information are displayed simultaneously, on one screen,
   wherein the display mode control step includes:
      a step of displaying at least either of identification information of an own device user or attribute information of the own device user as an icon, by providing a first display position associated with the attribute information of the own device user and arranging therein;
      a step of setting one other first display position with reference to the first display position associated with the attribute information of the own device user, and displaying at least either of identification information of a sender or attribute information of a sender other than the own device user as an icon, by arranging in the other first display position;
   a step of assigning a display region for displaying the icon to a plurality of divided display regions based on a number of electronic devices connected with the own device including the own device user;
   the step of displaying at least either of identification information of the own device user or attribute information of the own device user as an icon, by providing a first display position associated with the attribute information of the own device user in one of the divided display regions among the plurality of divided display regions thus assigned, and arranging therein; and
   a step of displaying as an icon at least either of identification information of each sender other than the own device user or attribute information of an affiliation of the sender, with reference to the first display position associated with the attribute of the own user, by respectively providing, and arranging therein, a first display position associated with the attribution information of each of the senders to the respective divided display regions other than a first display position associated with attribute information of the own device user that has been set;
   wherein the display unit or the wireless communication unit are implemented via a processor.

8. The method according to claim 7, wherein the wireless communication unit performs direct wireless communication.

9. An electronic device comprising:
   a display unit;
   a wireless communication unit that receives information including user information related to a sender and message information desired by the sender to be transmitted to a correspondence party which are sent and received, the user information including identification information of the sender and attribute information of the sender,
   wherein the attribute information of the sender is group information indicating a group to which the sender belongs based on a vehicle ridden by the sender, a family of the sender, or a destination associated with the sender, wherein the attribute information of the sender is set upon the sender departing by riding in the vehicle; and
   a display mode control unit that provides a first display position associated with the attribute information in the display unit, and displays the identification information and the attribute information simultaneously, on one screen, by arranging at the first display position,
   wherein the display mode control step includes:
      a step of displaying at least either of identification information of an own device user or attribute information of the own device user as an icon, by providing a first display position associated with the attribute information of the own device user and arranging therein;
      a step of setting one other first display position with reference to the first display position associated with the attribute information of the own device user, and displaying at least either of identification information of a sender or attribute information of a sender other than the own device user as an icon, by arranging in the other first display position;

a step of assigning a display region for displaying the icon to a plurality of divided display regions based on a number of electronic devices connected with the own device including the own device user;

the step of displaying at least either of identification information of the own device user or attribute information of the own device user as an icon, by providing a first display position associated with the attribute information of the own device user in one of the divided display regions among the plurality of divided display regions thus assigned, and arranging therein; and a step of displaying as an icon at least either of identification information of each sender other than the own device user or attribute information of an affiliation of the sender, with reference to the first display position associated with the attribute of the own user, by respectively providing, and arranging therein, a first display position associated with the attribution information of each of the senders to the respective divided display regions other than a first display position associated with attribute information of the own device user that has been set;

wherein the display unit, the display mode control unit, or the wireless communication unit are implemented via a processor.

10. The electronic device of claim 9, wherein the identification information of the sender is displayed in an arrangement on a circular arc or a circumference, and wherein the identification information and the attribute information of the sender is arranged in a concentric manner.

\* \* \* \* \*